US011477644B2

(12) United States Patent
Abhigyan et al.

(10) Patent No.: US 11,477,644 B2
(45) Date of Patent: Oct. 18, 2022

(54) NETWORK APPLICATION PROGRAMMING INTERFACE GUIDED SERVICE PLACEMENT

(71) Applicant: AT&T Intellectual Property I, L.P., Atlanta, GA (US)

(72) Inventors: Abhigyan Sharma Abhigyan, Basking Ridge, NJ (US); Gnanavelkandan Kathirvel, Pleasanton, CA (US); John Craig, Ocean Township, NJ (US); Paul Carver, Somerset, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 137 days.

(21) Appl. No.: 17/106,284

(22) Filed: Nov. 30, 2020

(65) Prior Publication Data

US 2022/0174486 A1 Jun. 2, 2022

(51) Int. Cl.
*H04W 12/06* (2021.01)
*H04L 47/10* (2022.01)
*H04L 67/00* (2022.01)
*H04W 12/08* (2021.01)

(52) U.S. Cl.
CPC ............ *H04W 12/06* (2013.01); *H04L 47/10* (2013.01); *H04L 67/34* (2013.01); *H04W 12/08* (2013.01)

(58) Field of Classification Search
CPC ...... H04W 12/06; H04W 12/08; H04L 47/10; H04L 67/34
See application file for complete search history.

(56) References Cited

U.S. PATENT DOCUMENTS

| 7,451,476 | B1 * | 11/2008 | Banks | ................... H04L 63/105 713/153 |
| 2004/0225878 | A1 * | 11/2004 | Costa-Requena | ....... H04L 63/08 713/150 |
| 2019/0037409 | A1 * | 1/2019 | Wang | ..................... H04W 8/08 |
| 2022/0107845 | A1 * | 4/2022 | Young | ..................... G06F 9/547 |

* cited by examiner

*Primary Examiner* — Normin Abedin
(74) *Attorney, Agent, or Firm* — Guntin & Gust, PLC; Andrew Gust

(57) ABSTRACT

Aspects of the subject disclosure may include, for example, a network API service makes multiple APIs available for guidance and control. The network API service may collect low-level network data related to network elements in access networks and core networks and analyze the low-level network data to create application-level metrics in response to API requests. Other embodiments are disclosed.

20 Claims, 20 Drawing Sheets

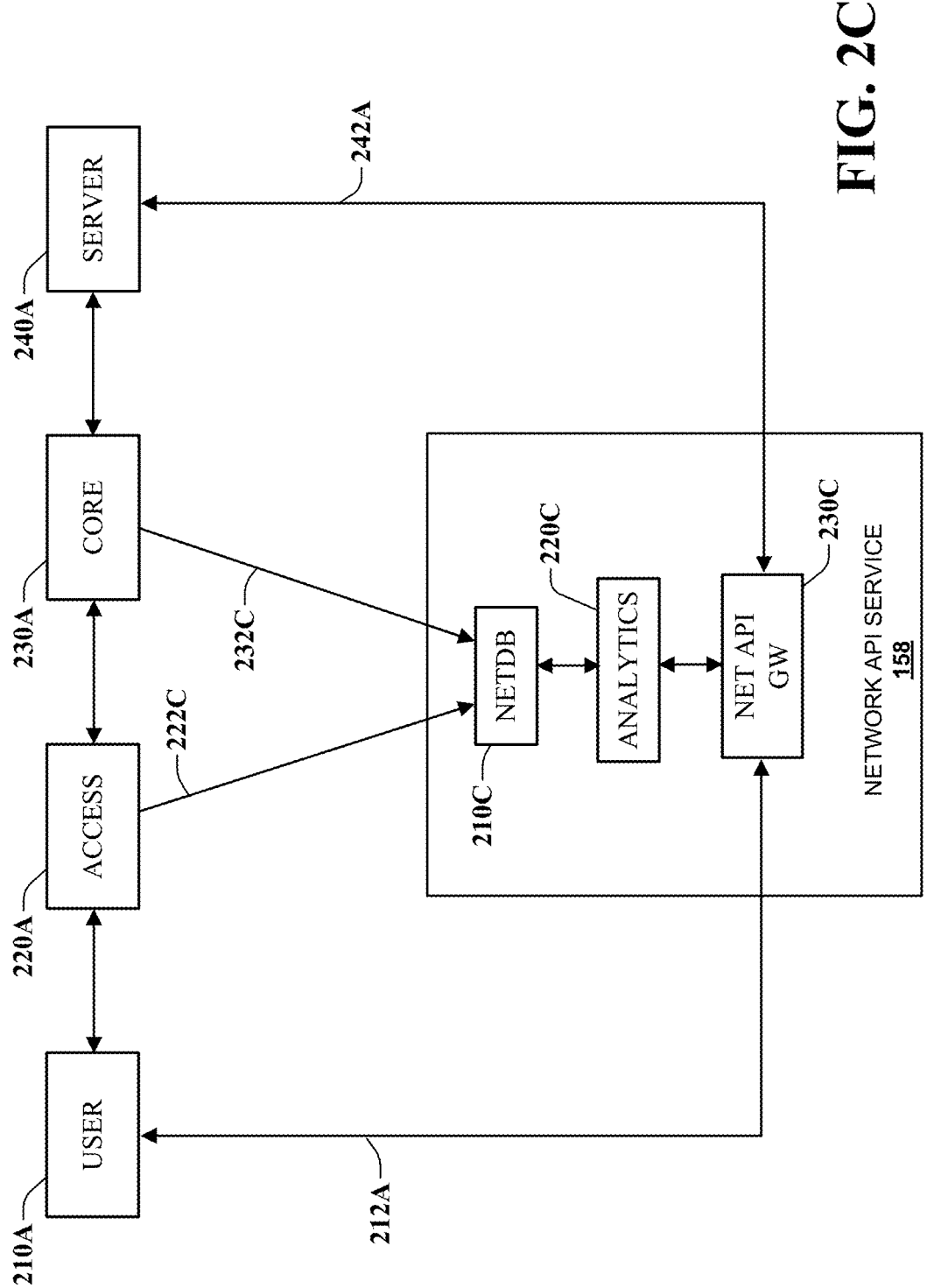

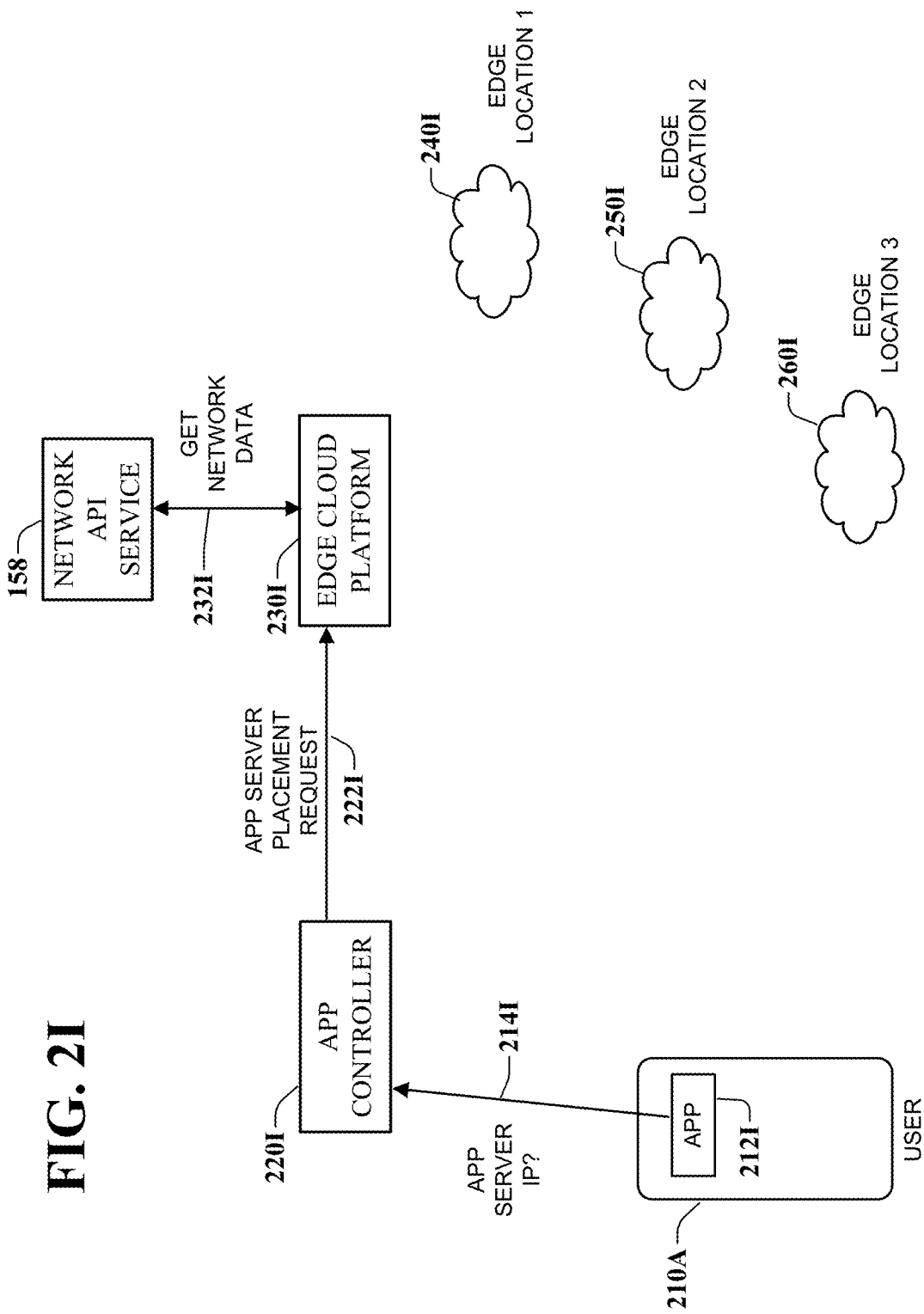

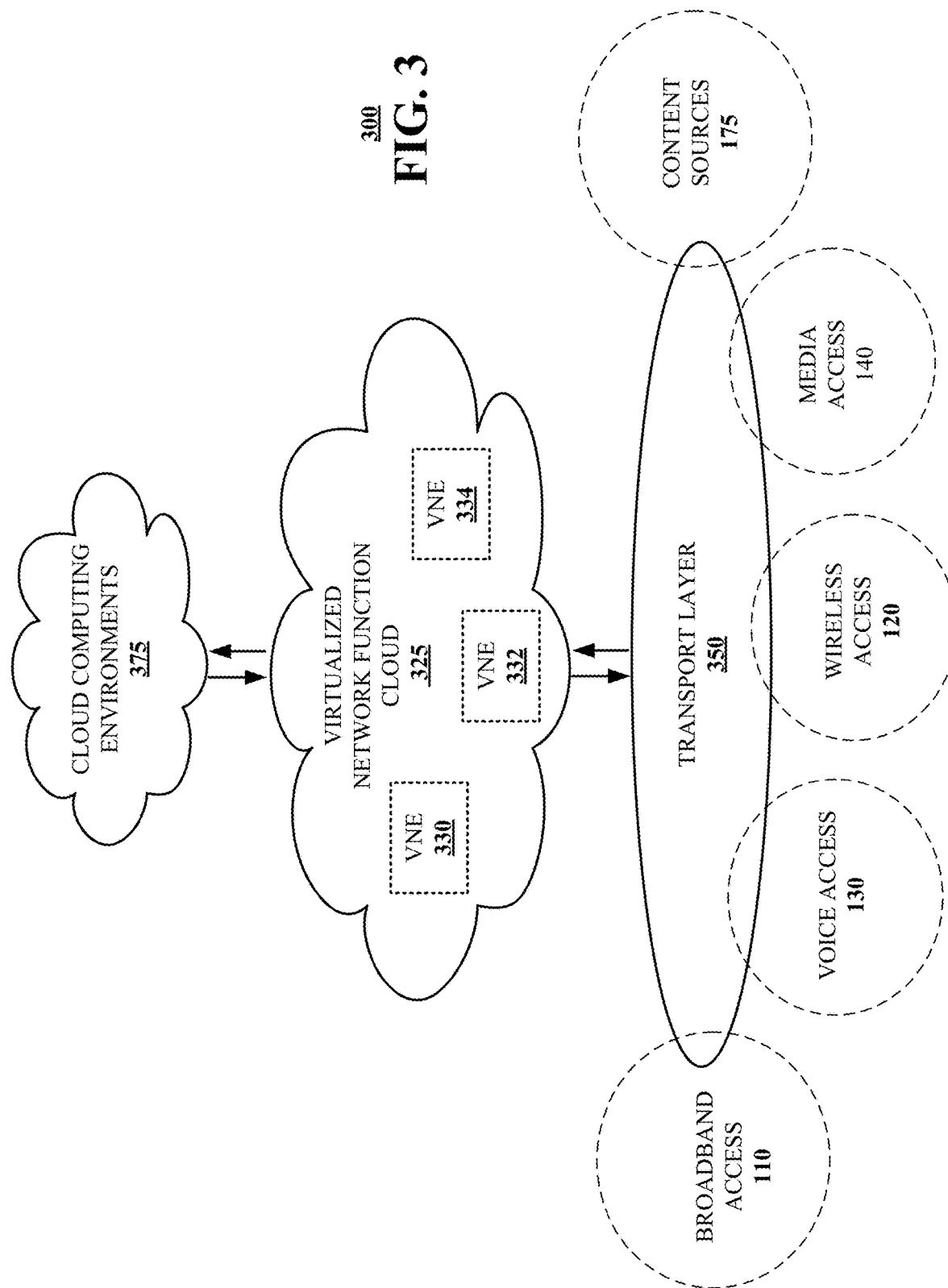

NETWORK APPLICATION PROGRAMMING INTERFACE GUIDED SERVICE PLACEMENT

FIELD OF THE DISCLOSURE

The subject disclosure relates to utilizing network data to make decisions regarding network operations.

BACKGROUND

Traditionally, applications are designed "over-the-top" of communications networks. These applications typically interact with other applications and servers at an application-level layer and do not need to be aware of lower-level layers within the communications network.

BRIEF DESCRIPTION OF THE DRAWINGS

Reference will now be made to the accompanying drawings, which are not necessarily drawn to scale, and wherein:

FIG. 2C is a block diagram illustrating an example, non-limiting embodiment of a network API service providing guidance functionality in accordance with various aspects described herein.

FIG. 2I is a block diagram illustrating an example, non-limiting embodiment of a user device requesting an internet protocol (IP) address of an application server in accordance with various aspects described herein.

FIG. 3 is a block diagram illustrating an example, non-limiting embodiment of a virtualized communication network in accordance with various aspects described herein.

DETAILED DESCRIPTION

Figure 1:
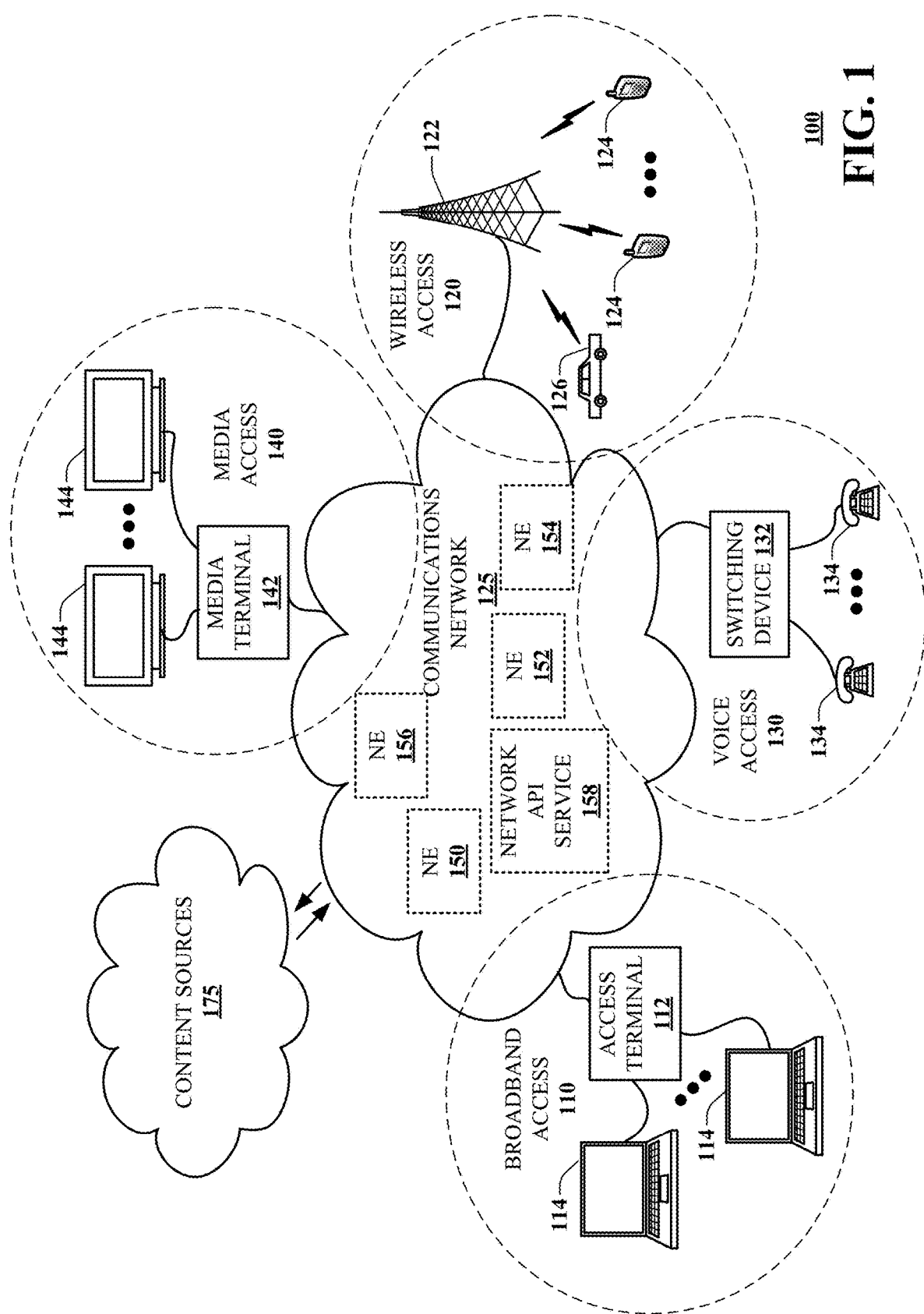
FIG. 1 is a block diagram illustrating an exemplary, non-limiting embodiment of a communications network in accordance with various aspects described herein.

The subject disclosure describes, among other things, illustrative embodiments of a system to expose both network guidance features and network control features to external applications. Low-level network data may be analyzed to produce metrics of interest to applications and future predictions of those metrics in real-time. The various embodiments combine data from multiple access and core networks to provide guidance to applications. The guidance enables client-side and server-side application adaptation. Various embodiments also expose control of both access network features and core network features to applications. Other embodiments are described in the subject disclosure.

One or more aspects of the subject disclosure include a user equipment (UE) device that includes a processing system including a processor; and a memory that stores executable instructions that, when executed by the processing system, facilitate performance of operations, the operations including authenticating, by the UE device, to a network application programming interface (API) service in communication with an access network and a core network, wherein the network API service is configured to expose network data outside the core network and the access network; responsive to the authenticating, receiving, by the UE device, an authentication nonce; requesting, by the UE device, the network data from the network API service, wherein the requesting comprises providing the authentication nonce to the network API service; and performing an adaptation at the UE device in response to the network data.

One or more aspects of the subject disclosure include a non-transitory machine-readable medium, including executable instructions that, when executed by a processing system including a processor, facilitate performance of operations, the operations including communicating, by a user equipment (UE) device, with a core network through an access network; authenticating, by the UE device, to a network application programming interface (API) service in communication with the access network and the core network, wherein the network API service is configured to provide an ability to modify a plurality of network features in the access network and the core network; responsive to the authenticating, receiving, by the UE device, an authentication nonce; and requesting, by the UE device, that the network API service modify a first network feature of the plurality of network features, wherein the requesting comprises providing the authentication nonce to the network API service.

One or more aspects of the subject disclosure include a method, including communicating, by a processing system including a processor, with a core network through an access network; authenticating, by the processing system, to a network application programming interface (API) service in communication with the access network and the core network, wherein the network API service is configured to expose network data outside the core network and access network; responsive to the authenticating, receiving, by the processing system, an authentication nonce; and providing, by the processing system, the authentication nonce to a server application in communication with a user application on the processing system to enable the server application to receive the network data from the network API service.

One or more aspects of the subject disclosure include a user equipment (UE) device including a processing system including a processor; and a memory that stores executable instructions that, when executed by the processing system, facilitate performance of operations, the operations including authenticating, by the UE device, to a network application programming interface (API) service in communication with an access network and a core network, wherein the network API service is configured to expose network data outside the core network and the access network; responsive to the authenticating, receiving, by the UE device, an authentication nonce; providing, by the UE device, the authentication nonce to an edge cloud platform to enable the edge cloud platform to receive the network data from the network API service and determine an edge location to instantiate an application server, the application server having an IP address; receiving, by the UE device, the IP address of the application server; and communicating, by the UE device with the application server at the IP address.

One or more aspects of the subject disclosure include a non-transitory machine-readable medium, including executable instructions that, when executed by a processing system including a processor, facilitate performance of operations, the operations including receiving, from a user equipment (UE) device, an authentication nonce to access a network application programming interface (API) service in communication with an access network and a core network, wherein the network API service is configured to expose network data outside the core network and the access network; receiving, from the UE device, a request for an IP address of an application server subject to at least one performance constraint; providing the authentication nonce to the network API service; requesting, from the network API service, network data regarding potential edge locations to instantiate the application server; comparing the at least one performance constraint to the network data; responsive to the comparing, selecting an edge location to instantiate the application server; and providing an IP address of the application server to the UE device.

One or more aspects of the subject disclosure include a method including collecting, by a processing system including a processor, low-level network data and storing it in a database; receiving, by the processing system, an authentication request from a user equipment (UE) device; determining, by the processing system, that the UE device has network application programming interface (API) service privileges; providing, by the processing system, an authentication nonce to the UE device; receiving, by the processing system, the authentication nonce from an edge cloud platform; receiving, by the processing system, a request for application-level network data from the edge cloud platform; analyzing, by the processing system, the low-level network data to create the application-level data; and providing, by the processing system, the application-level data to the edge cloud platform to enable the edge cloud platform to select an edge location to instantiate an application server.

Referring now to FIG. 1, a block diagram is shown illustrating an example, non-limiting embodiment of a system 100 in accordance with various aspects described herein. For example, system 100 can facilitate in whole or in part a network API service that combines data from access and core networks and provides guidance and control services to API users. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

The communications network 125 also includes network API service 158. As further described below with reference to later figures, network API service 158 collects and stores data from various network elements and access networks, and then makes that data available to applications and other entities that otherwise typically would not have access to network data. For example, network API service 158 may collect low-level network data from access networks such as wireless access 120, broadband access 110, voice access 130, media access 140, and the like. Also for example, network API service 158 may collect low-level network data from network elements within a core network such as NEs 150, 152, 154, and 156 within communications network 125.

In some embodiments, network API service 158 may provide many different types of APIs. For example, in some embodiments, network API service 158 may provide "guidance" APIs that analyze network data and provide insights to applications (e.g., predictions of future network performance) that enable applications to adapt based on the guidance. Also for example, network API service 158 may provide "control" APIs that provide applications (or users) control of aspects or features of the network (e.g. available bandwidth). To provide a complete view of the network, network API service 158 may tap into data sources from multiple access networks (e.g., cellular, fixed-access) as well as core networks (e.g., mobility core, IP backbone). Network API service 158 may also provide an analytics engine that ingests data streams from multiple sources and output metrics of interest to applications in real time. Network API service 158 may track these metrics separately for each user and may provide accurate estimates (e.g., wireless/cellular performance) for a given user. In some embodiments, control APIs utilize various controllers for access and core networks (e.g., radio access network (RAN) intelligent controller, 5G Network Exposure Function (NEF), etc.). These and other controllers may be exposed by network API service 158 to external applications (and users) for them to request features from the network in an on-demand manner. These and other embodiments are more fully described below with reference to later figures.

In some embodiments, network API service 158 may be useful for guidance on wireless access links due to the variability of wireless link performance and user mobility at short time scales. These challenges make it difficult to estimate and to predict network performance purely at the client and/or server end points. In some embodiments, network API service 158 uses a combination of measurements at a user level and at the base station level to estimate and to predict wireless performance. User level parameters may include received signal strength, signal quality, timing advance, and so on. Base station level parameters may include number of users, traffic demands from users, availability of physical resource blocks at radios and so on. Network API service 158 may provide superior predictions precisely because it has access to these low-level network measurements that are not available to external entities outside the network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
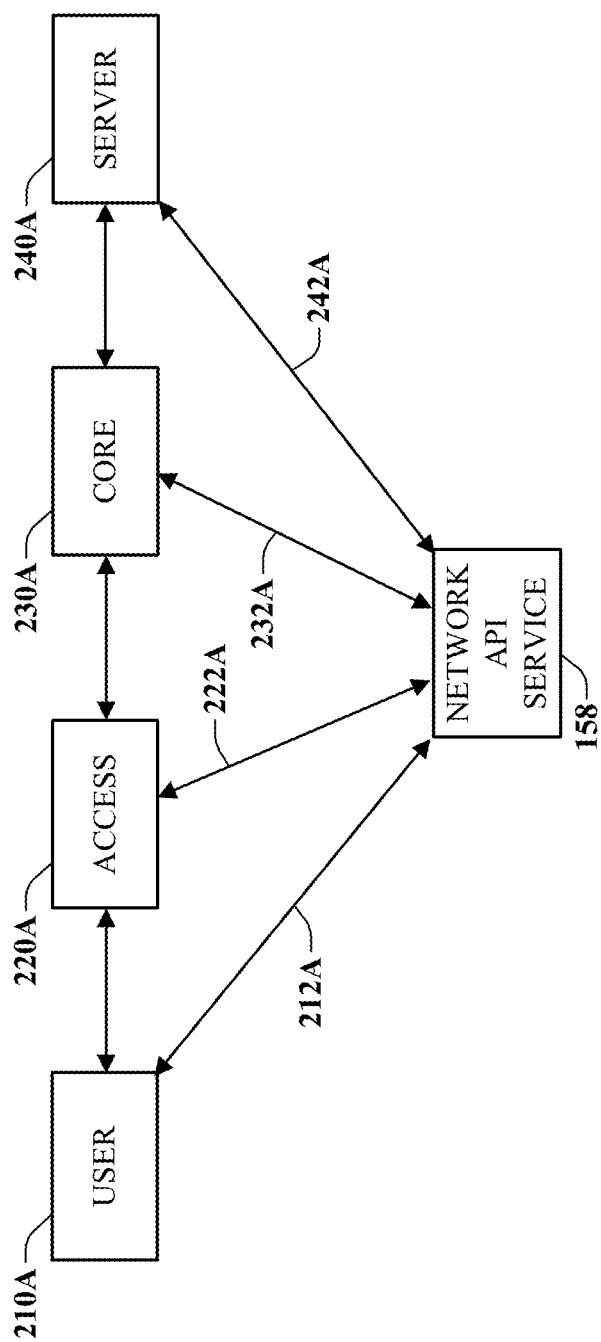
FIG. 2A is a block diagram illustrating an example, non-limiting embodiment of a network application programming interface (API) service functioning within the communication network of FIG. 1 in accordance with various aspects described herein.

FIG. 2A is a block diagram illustrating an example, non-limiting embodiment of a network application programming interface (API) service functioning within the communication network of FIG. 1 in accordance with various aspects described herein. FIG. 2A shows network API service 158 communicating with user equipment (UE) 210A, access network 220A, core network 230A, and server application 240A. UE 210A may be any device capable of communicating with access network 220A and network API service 158. For example, UE 210A may be cellular user equipment, set top boxes or routers, or other customer premise equipment. Also for example, UE 210A may be limited to a single application or program being executed on a user device. An example application may be an app on a smartphone, a video application on a smart TV, or a navigation app in an automobile. In some embodiments, UE 210A may support multiple access networks. For example, UE 210A may be capable of connecting to a cellular radio access network, a Wi-Fi access point, a tethered broadband connection, or any other type of access network. The terms "user device" and "user equipment" are used interchangeably herein.

Access network 220A may be any type (or any number) of access networks that enables UE 210A to communicate with core network 230A. For example, access network 220A may be any of the access networks described above with reference to FIG. 1. Access network 220A may include many devices or elements capable of providing data to network API service 158 at 222A. For example, access network 220A may include network routers, switches, cellular base stations, and the like.

Core network 230A may be any communications network capable of providing services to UE 210A through an access network, such as access network 220A. For example, core network 230A may be implemented as communications network 125 (FIG. 1). In some embodiments, core network 230A provides an entry point to data networks for user devices. For example, core network 230A may access data networks outside of core network 230A to provide connectivity between external networks and UE 210A. Also for example, core network 230A may provide connectivity to a server such as server 240A.

In some embodiments, server 240A may be a hardware server upon which applications may execute, where those applications provide services to UE 210A. Also in some embodiments, server 240A may be a virtual machine or virtual network element executing on hardware within core 230A, in a cloud environment, or in a distributed environment.

In some embodiments, network API service 158 may collect and store network data from one or more of the elements shown in FIG. 2A, and may then expose that network data to one or more of the same elements shown FIG. 2A. For example, network API service 158 may collect information from UE 210A at 212A and from server 240A at 242A. User data collected by network API service 158 may include information regarding resource usage by UE 210A or server 240A (e.g., bandwidth usage, connection type, identifying information, etc.), device type, location, or any other information pertaining to the user, user device, server, applications, or the use thereof.

Network API service 158 may also collect low-level network data from access network 220A at 222A and core network 230A at 232A. Examples include current measured latency between elements within access network 220A or core network 230A, real-time load of elements in access network 220A or core network 230A, available bandwidth of communication paths within access network 220A or core network 230A, and the like.

In some embodiments, network elements within core network 230A and elements within access network 220A offer services to provide low-level network data, and network API service 158 may subscribe to these services. In some embodiments, elements within access network 220A and core network 230A may output streams of data or events on a per-user basis or aggregate basis with on/off subscriptions. Data may be collected from these elements on a periodic basis or an on-demand basis. For example, during periods of light network load, data may be collected less frequently than during periods of high network load when network dynamics may change quickly.

In some embodiments, network API service 158 responds to requests from UE 210A and/or server 240A to provide the low-level network data. Further, in some embodiments, network API service 158 may analyze and/or synthesize the low-level network data previously collected and provide application-level data or metrics to UE 210A and server 240A. In some embodiments, network API service 158 provides the network data to provide guidance to UE 210A and/or server 240A so that they may make adaptations in accordance with the data provided. For example, UE 210A may request data that represents actual available bandwidth within access network 220A and core network 230A. In response to the available bandwidth information provided by network API service 158, UE 210A may modify a bitrate selection, a video quality, accelerate or delay a request for data, or may perform any other adaptation.

In some embodiments, network API service 158 may expose control functions that allow subscribers to API services to control various network features. For example, network API service 158 may expose network controller interfaces such as an interface to a radio access network controller or a 5G network exposure function (NEF). In these embodiments, UE 210A and/or server 240A may make requests to change features within access network 220A and/or core network 230A. Example features may include quality of service (QoS) settings, bandwidth reservation, charging services, or service insertion (e.g., firewall, proxy, etc.).

In some embodiments, network API service 158 provides a single go-to platform to access all network APIs for applications, e.g., RAN control, Network Analytics APIs, and Core APIs. Network API service 158 creates a separate channel of communication between the network and applications, and does not require architectural changes to the network, user, or server software stack. The various embodiments support low-latency edge-computing use cases (e.g., closed loop factory automation) due to data locality close to end user, real-time analytics of such data, and API-driven on-demand control of network features.

Figure 2B:
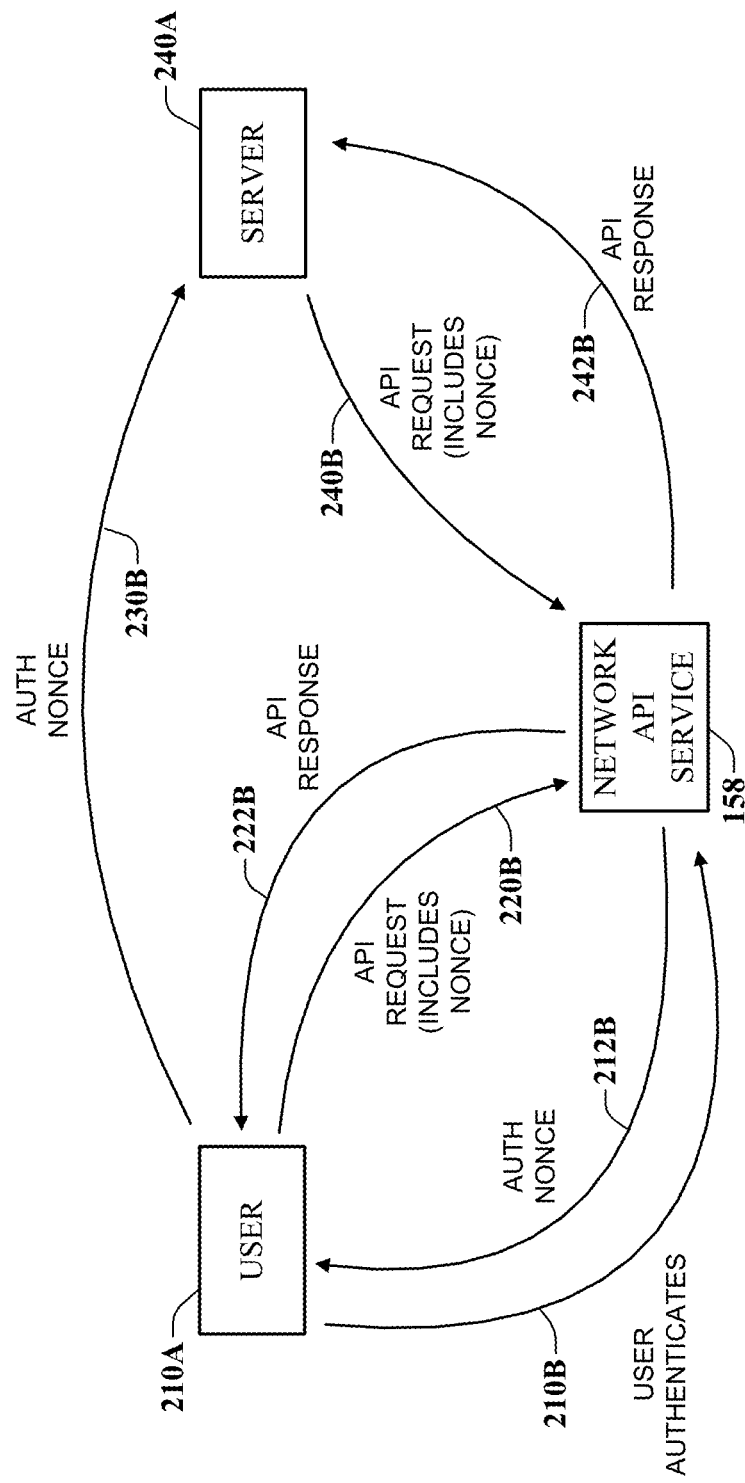
FIG. 2B is a block diagram illustrating an example, non-limiting embodiment of an authentication method in accordance with various aspects described herein.

FIG. 2B is a block diagram illustrating an example, non-limiting embodiment of an authentication method in accordance with various aspects described herein. In some embodiments, network API service 158 requires users of the API service to first be authenticated. The example authentication process shown in FIG. 2B authenticates UE 210A to network API service 158 and then verifies that future API service requests are made by authenticated users or by other elements on behalf of the authenticated users.

UE 210A provides an authentication request to network API service 158 at 210B. In response to the authentication request, network API service 158 determines whether UE 210A is provisioned for network API service privileges. In some embodiments, this may be limited to verifying that UE 210A is a mobility customer of a network operator. In other embodiments, this may include verifying that a user profile includes information specifying that the user has network API service privileges.

The authentication request made at 210B may be performed on behalf of a user, a specific user device, or a specific user application executing on a specific device. For example, when the authentication is on behalf of a user, then that authenticated user may request network API services from any device or any application. Also for example, when the authentication is on behalf of a user device, then that user device may request network API services on behalf of any application running on the user device. Further, when the authentication is on behalf of an application, then API services may be limited to requests made solely by that application. In general, authentication may be performed at any level of granularity and on behalf of any person, hardware device, or process executing on a hardware device.

In response to determining that UE 210A has network API service privileges, network API service 158 provides an authentication nonce to UE 210A at 212B. In some embodiments, the authentication nonce is a one-time-use identifier that uniquely identifies UE 210A as having been authenticated by network API service 158. The authentication nonce may be randomly generated, cryptographically generated, or may be generated using any authentication process. In some embodiments, the authentication nonce represents not only an identifier, but a process. For example, the authentication nonce may be a shared key, a public key, or a cryptographic challenge/response.

Once UE 210A is authenticated, UE 210A may make an API request at 220B. As part of the API request, UE 210A provides the authentication nonce to network API service 158. Network API service 158 verifies the authentication nonce as valid and provides an API response to UE 210A at 222B. The interactions between UE 210A and network API service 158 shown at 210B, 212B, 220B, and 222B represent a user authenticating to a network API service and the network API service limiting access to a user that has been previously authenticated. In some embodiments, network API service 158 will respond to requests from elements that have not been directly authenticated, but have been authorized by authenticated users. These and other embodiments are described further below.

In some embodiments, an authenticated user may provide an authentication nonce to a separate element to authorize that separate element to access network API services on behalf of the authenticated user. For example, as shown in FIG. 2B, UE 210A may provide the authentication nonce to server 240A at 230B. Server 240A may perform an API request at 240B. The API request at 240B may include the authentication nonce provided by UE 210A. In response to the API request at 240B, network API service 158 verifies the authentication nonce as valid and provides an API response to server 240A at 242B.

In some embodiments, authentication to network API service 158 is limited to users such as UE 210A, and does not allow direct authentication by other elements such as server 240A. In other embodiments, elements other than users may be provided direct authentication methods thereby allowing a server such as server 240A to provide its own authentication nonce when performing an API request.

FIG. 2C is a block diagram illustrating an example, non-limiting embodiment of a network API service providing guidance functionality in accordance with various aspects described herein. As shown in FIG. 2C, network API service 158 includes network database 210C, analytics engine 220C, and network API gateway 230C. In some embodiments, network database 210C is a storage mechanism capable of storing network data collected from the various elements shown in FIG. 2C. For example network database 210C may include memory allocated in a virtual machine or on a server. Also for example, network database 210C may be distributed storage that stores network data in different locations.

Analytics engine 220C may be implemented in any manner. For example, analytics engine 220C may be a process or program running on a virtual machine or server, and may also be implemented in a distributed manner. In some embodiments, analytics engine 220C is distributed such that each distributed piece of network database 210C includes a co-located analytics engine. Analytics engine 220C may include storage or may be stateless. For example, in some embodiments, analytics engine 220C may analyze data stored in network database 210C without providing for long term storage for the results.

Network API gateway 230C provides an external interface for API network service 158. For example, network API gateway 230C may provide a list of APIs available to applications, provide a mechanism to register applications and authenticate users, and to request user consent to release data.

In operation, network API service 158 collects low-level network data from various elements as shown in FIG. 2C. For example, access network 220A may provide low-level network data at 222C and core network 230A may provide low-level network data at 232C. In some embodiments, network API service 158 stores low-level network data in network database 210C.

The low-level network data may be collected periodically or in response to events. For example, access network 220A may provide low-level network data when a particular user authenticates to the access network. Also for example, network API service 158 may subscribe to one or more services published by elements within access network 220A to receive network data either on a periodic basis or as a result of events. Similarly, core network 230A may provide low-level network data either on a periodic basis or as a result of events. Various network elements within core network 230A may publish services to provide low-level network data, and network API service 158 may subscribe to those services within core network 230A to receive low-level network data either on a periodic basis or as a result of events.

Analytics engine 220C may provide any type of analytics or synthesis in support of the operation of network API service 158. For example, analytics engine 220C may consume raw data streams from network database 210C to produce application-level metrics in real time. Also for example, analytics engine 220C may translate from access-level and core-level metrics to application-level metrics (e.g., throughput calculations from radio access network metrics). Further, in some embodiments, analytics engine 220C may perform future predictions from past data. Examples include predictions of future bandwidth availability or future load characteristics of particular network elements. In some embodiments, analytics engine 220C may provide user specific predictions or provide predictions for classes of users (e.g., users in a given location, time of day, device type, etc.). Also for example, analytics engine 220C may keep historical records of predictions in network database 210C possibly by expanding the database schema. The historical records may be maintained on an aggregate basis, on a per-user basis, or any other basis.

Network API gateway 230C may provide authentication services to applications, user devices, or users. For example, as discussed above with reference to FIG. 2B, network API gateway 230C may receive authentication requests, determine that the requestor has sufficient privileges, and then provide an authentication nonce to the requestor. Network API gateway 230C may also receive requests for API services. As an example, network API gateway 230C may receive a request from UE 210A for a value describing the end-to-end latency that currently exists between UE 210A and server 240A. In response to the request, network API gateway 230C may request analytics engine 220C to analyze and/or synthesize low-level network data in network database 210C to produce the requested latency value. The requested latency value is an example of an application-level data or metric.

In some embodiments, UE 210A, after receiving guidance from network API service 158, may perform client-side adaptations. For example, UE 210A may perform bitrate selection or video prefetching in response to guidance received from network API service 158. In general, UE 210A may take any action or perform any adaptation in response to guidance received from network API service 158 in response to API requests.

In some embodiments, network API gateway 230C may also receive API requests from entities that have not been directly authenticated. For example, network API gateway 230C may receive an API request from server 240A. In some embodiments, server 240A may provide, as part of the API request, an authentication nonce previously registered to a user device. In other embodiments, server 240A may identify UE 210A in some other manner as part of the API request. In these embodiments, network API gateway 230C may request permission from UE 210A to respond to server 240A. UE 210A may grant or deny the permission. When server 240A has the appropriate permission, via an authentication nonce or other mechanism, network API gateway 230C utilizes analytics engine 220C and network database 210C to respond to the API request in the same manner that it responds to requests from UE 210A.

In some embodiments, server 240A, after receiving guidance from network API service 158, may perform server-side adaptations. For example, server 240A may implement congestion control or may prioritize requests to meet latency requirements in response to guidance received from network API service 158. In general, server 240A may take any action or perform any adaptation in response to guidance received from network API service 158 in response to API requests.

Figure 2D:
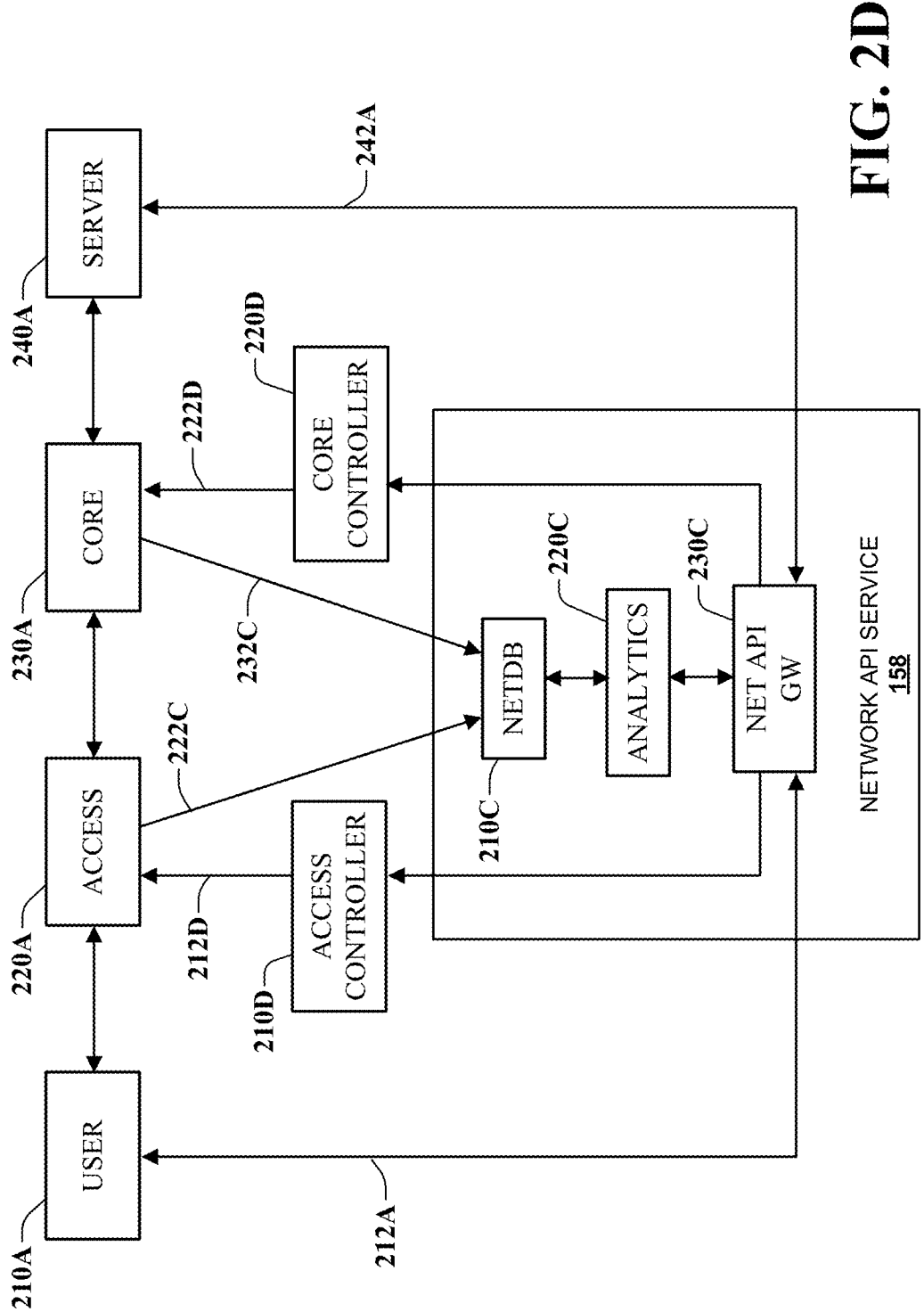
FIG. 2D is a block diagram illustrating an example, non-limiting embodiment of a network API service providing control functionality in accordance with various aspects described herein.

FIG. 2D is a block diagram illustrating an example, non-limiting embodiment of a network API service providing control functionality in accordance with various aspects described herein. FIG. 2D shows all of the elements of FIG. 2C with the addition of access controller 210D and core controller 220D. In embodiments represented by FIG. 2D, network API service 158 may modify network features within access network 220A using access controller 210D, and may modify network features within core network 230A using core controller 220D.

In operation, user devices such as UE 210A or servers such as server 240A may request network feature modifications to meet various requirements (e.g., QoS, slicing, latency, etc.). When network API gateway 230C receives an API request to modify network features, the request is routed to the appropriate controller. For example, if UE 210A requests a modification of a network feature within access network 220A, network API gateway 230C routes the request to access controller 210D which then makes the feature modification within access network 220A at 212D. Also for example, if UE 210A requests a modification of a network feature within core network 230A, network API gateway 230C routes the request to core controller 220D which then makes the feature modification within core network 230A at 222D. In still further examples, server 240A may request a modification of a network feature within access network 220A and network API gateway 230C may route that request to access controller 210D. In addition, server 240A may request a modification of a network feature within core network 230A and network API gateway 230C may route that request to network controller 220D.

Requests to modify network features may be performed in response to guidance previously received from network API service 158. For example, in response to a request for application-level bandwidth estimates, UE 210A may request a particular bandwidth reservation within access network 220A. Also for example, in response to a request for application-level latency estimates, server 240A may request the addition or removal of a proxy within core network 230A. In other embodiments, requests to modify network features are performed without first receiving guidance from network API service 158. For example, UE 210A may request a modification in the current network slice without first requesting guidance from network API service 158. In general, any combination of guidance and control may be provided by network API service 158 and any combination of guidance and control may be utilized by various user devices and servers.

In some environments, access controller 210D and core controller 220D are centralized software defined controllers having interfaces exposed to external applications. For example, access controller 210D may be implemented as an Open Radio Access Network (O-RAN) radio intelligent controller, and core controller 220D may be implemented as a 5G network exposure function (NEF) or a 4G service capabilities exposure function (SCEF). The various controllers are not limited to the foregoing examples. In some embodiments, controllers are standards compliant, and in other embodiments, controllers are not standards compliant. For example, in some embodiments, custom controllers may be included within network API service 158.

Figure 2E:
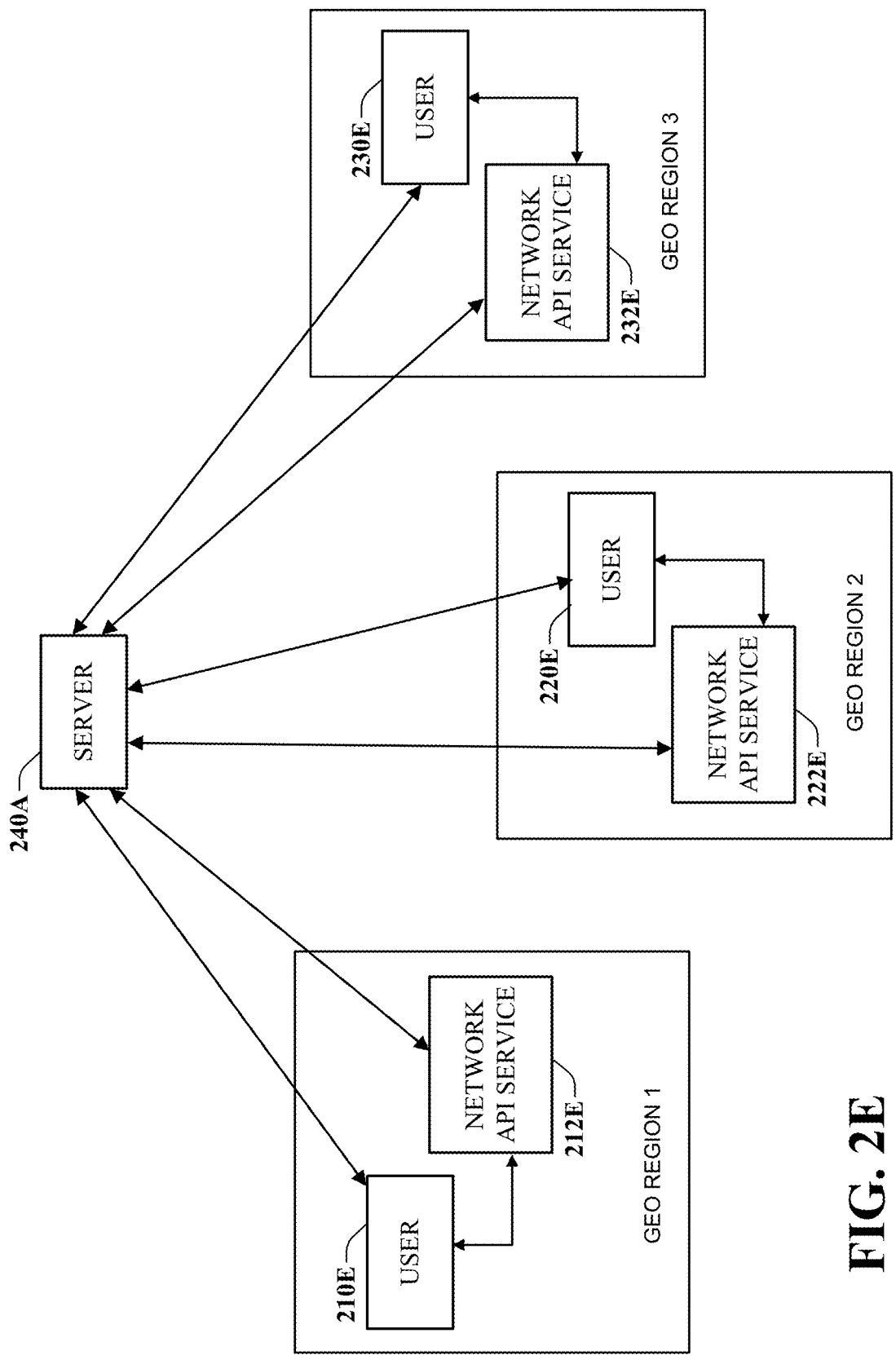
FIG. 2E is a block diagram illustrating an example, non-limiting embodiment of a distributed network API service in accordance with various aspects described herein.

FIG. 2E is a block diagram illustrating an example, non-limiting embodiment of a distributed network API service in accordance with various aspects described herein. The network API service shown in FIG. 2E is distributed across three geographical regions. For example, network API service 212E is located in geographical region one, network API service 222E is located in geographical region two and network API service 232E is located in geographical region three. In some embodiments, the different network API services are implemented in a network core or on network edges, or in cloud-based network edge locations. In some embodiments, users in a particular geographical region are redirected to network API services that are physically located in the same geographical regions when requesting network API services. For example, user 210E may make a request of a centralized network API service such as network API service 158 (FIG. 2A), and user 210E may be redirected to network API service 212E to reduce latency and network bandwidth consumption. Similarly, user 220E may be redirected to network API service 222E and user 230E may be redirected to network API service 232E.

In some embodiments, network API services in different geographical regions duplicate all low-level network data that is collected. In these embodiments, any user in any geographical region may have access to the same low-level network data and the same application-level data regardless of user location. In other embodiments, distributed network API services emphasize the collection of low-level network data in their geographical region. In these embodiments, network API services in different geographical regions may have partial overlap of low-level data collected and stored, but may also have low-level network data unique to their geographical region. In these embodiments, a network API service in a particular geographical region may be more likely to have low-level network data of interest to a user in the same geographical region.

In some embodiments, a single server such as server 240A in FIG. 2E may communicate with multiple users in different geographic regions. In these embodiments, this single server may communicate with multiple network API services in different locations depending on the geographical regions in which the users operate. For example, if user 210E has authenticated and received an authentication nonce from network API service 212E and provided that authentication nonce to server 240A, server 240A may provide that authentication nonce to network API service 212E when requesting guidance on behalf of user 210E. Likewise, server 240A may provide an authentication nonce received from user 220E when communicating with network API service 222E, and may use an authentication nonce received from user 230E when communicating with network API service 232E.

Figure 2F:
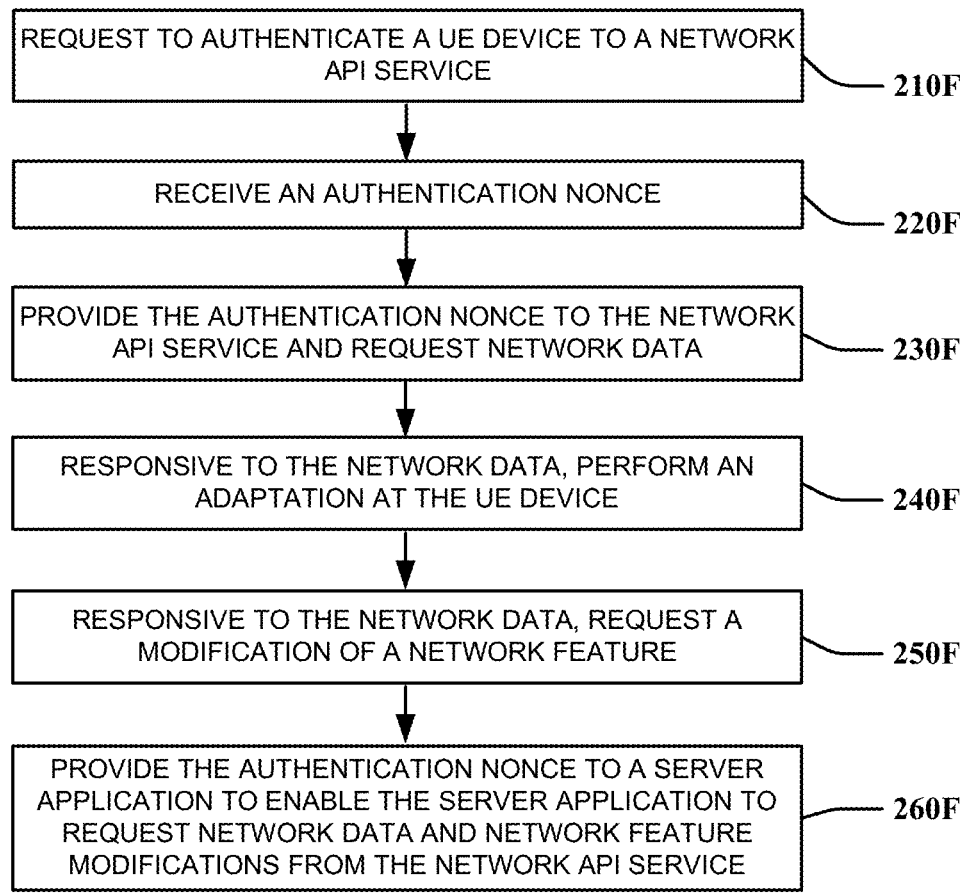
FIGS. 2F-2H depict illustrative embodiments of methods in accordance with various aspects described herein.

FIGS. 2F-21 depict illustrative embodiments of methods in accordance with various aspects described herein. Referring to FIG. 2F, method 200F may be performed by a user, a user equipment (UE) device, an application running on a UE device, or any other consumer of network API services. For example, the operations of method 200F may be performed by a broadband customer having a tethered connection to a laptop computer, a mobility customer with a handheld device connected to a radio access network, an application running on an infotainment center in an automobile, or the like.

At 210F, a request is made to authenticate a UE device to a network API service. In some embodiments, this corresponds to a UE device requesting authentication from a network API service such as network API service 158. At 220F, an authentication nonce is received. In some embodiments, the authentication nonce is a cryptographic nonce, and in other embodiments the authentication nonce is a one-time-use randomly generated number used as a user-ID. In some embodiments, the authentication nonce is provided only after the UE device has been verified as a device with network API service privileges.

At 230F, the authentication nonce is provided to the network API service to request network data. In some embodiments, the request is for low-level network data which is collected directly from network elements in an access network, a core network, or the like. In other embodiments, the network data requested is application-level data such as end-to-end bandwidth or end-to-end latency. At 240F, an adaptation at the UE device is performed in response to the network data. Examples of adaptations at the UE device include bitrate selection, video pre-fetching, delaying nonessential downloads of large amounts of data, and the like. The actions of 240F correspond to adaptations based on guidance received from the network API service.

At 250F, a network feature modification is requested in response to the network data. The actions of 250F correspond to network API services that provide control of network features in access networks, core networks, or the like. For example, as described above with reference to FIG. 2D, access controllers and core controllers may be utilized to modify network features in response to requests satisfied by the network API service.

At 260F, the authentication nonce is provided to a server to enable the server to request network data and network feature modifications from the network API service. In some embodiments, this allows an application server to request guidance or feature modification on behalf of the UE device that was previously authenticated to the network API service. In some embodiments, the UE device performing method 200F may receive, from a network API service, a request to allow a server to access the network API service on behalf of the UE device. In these embodiments, the UE device may grant or deny the permission based on any criteria.

Figure 2G:
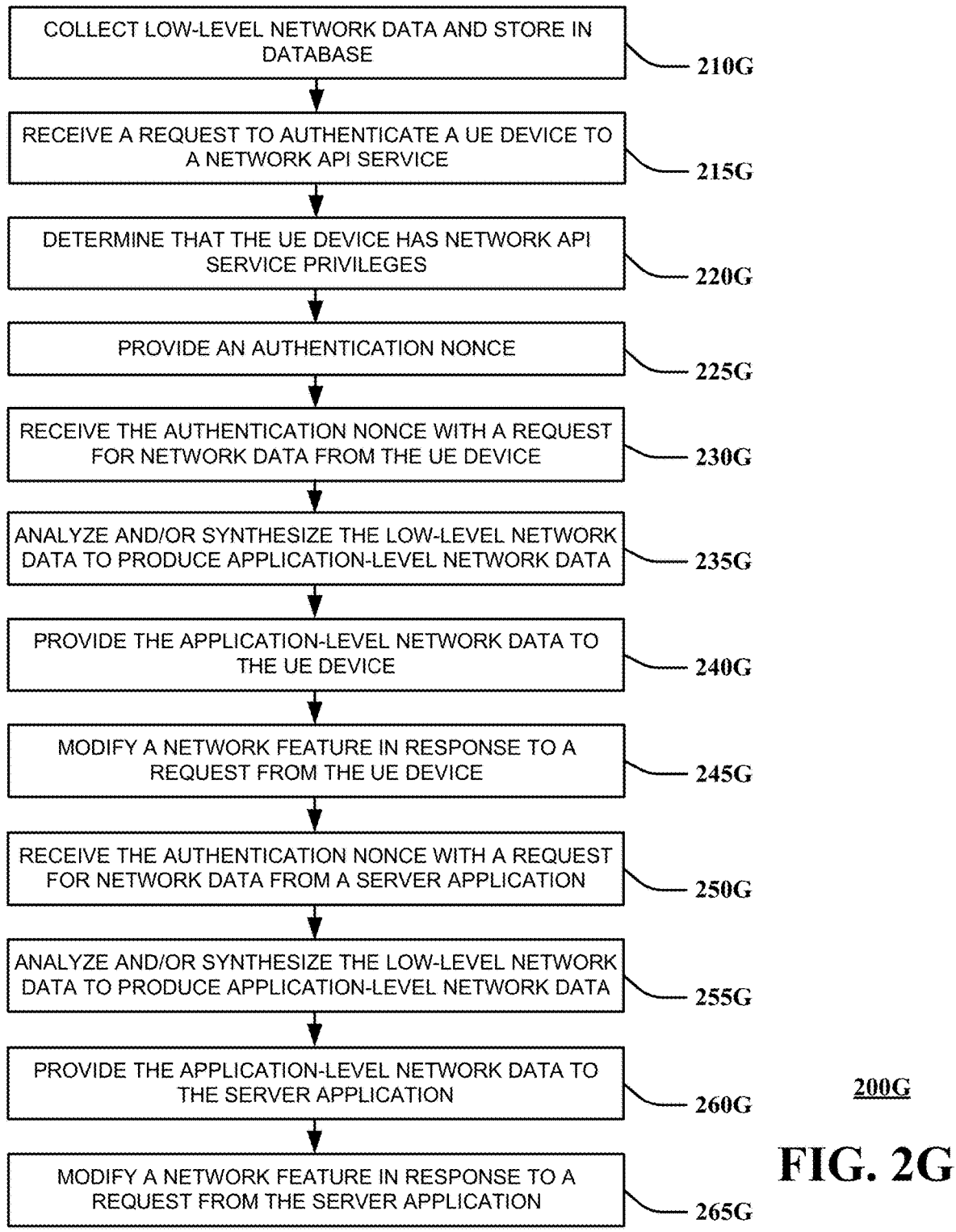

Referring to FIG. 2G, method 200G may be performed by a network API service such as network API service 158. At 210G, low-level network data is collected and stored in a network database. In some embodiments, the low-level network data is collected from access networks, core networks, or any other network element in communication with the network API service. In some embodiments, the database is a distributed database and distributed portions of the database may be included in a core network, an edge network, or any portion of a cloud-based network.

At 215G, a request to authenticate a UE device is received at the network API service. In some embodiments, this corresponds to a request being received on behalf of a user, on behalf of a UE device, or on behalf of an application running on a UE device. For example, the authentication request may provide authentication to all devices registered to a particular user, to the particular device that is communicating the request for authentication, or to a particular application that is running on the UE device requesting authentication.

At 220G, the network API service determines that the UE device has network API service privileges. In some embodiments, this corresponds to verifying that the UE device is registered to a user of a particular service provider. In other embodiments, this corresponds to verifying that a user account corresponding to the UE device or the application requesting authentication has specific privileges to access one or more network API services. At 225G, in response to determining that the UE device has network API service privileges, an authentication nonce is provided to the UE device. In some embodiments, the authentication nonce is a cryptographic nonce, and in other embodiments, the authentication nonce is non-cryptographic.

At 230G, a request for network data is received from the UE device along with the authentication nonce. Providing the authentication nonce allows the network API service to recognize the UE device performing the request as an authenticated entity (e.g., user, device, or application). The request for network data may be a request for low-level network data describing any portion of an access network or a core network, or may be a request for application-level data that may be produced from an analysis of low-level network data.

At 235G, the low-level network data stored in the network database at 210G is analyzed and/or synthesized to produce application-level network data. For example, in some embodiments, if a request for end-to-end latency between a particular user device and a particular server is part of the API request, low-level network data describing latency of individual network elements within the access network and the core network may be synthesized to produce an end-to-end latency value of interest to the application. At 240G, the application-level network data is provided to the UE device. The operations up to and including the actions of 240G correspond to a network API service that provides guidance to user devices and servers that perform API requests.

At 245G, a request is received from the UE device to modify a network feature, and the network feature is modified in response to the request. In some embodiments, this corresponds to a user device requesting a feature modification within an access network or a core network. In response to the request to modify a network feature, the network API service performing method 200G may interface with an access controller such as access controller 210D or core controller 220D (FIG. 2D).

At 250G, the authentication nonce previously provided to the UE device at 225G is received from a server with a request for network data. In some embodiments, this corresponds to a server having received a copy of an authentication nonce from an authenticated user so that the server may request network data from a network API service on behalf of the user. At 255G, low-level network data is analyzed and/or synthesized to produce application-level network data similar to the operations described above with reference to 235G. At 260G, the application-level network data produced at 255G is provided to the requesting server. The requesting server may perform adaptations based on the guidance provided at 260G. For example, the server application may modify its own operation based on the guidance received from the network API service. At 265G, the server may request modification of a network feature and the network API service may modify the network feature in response. For example, the server may request insertion of a service such as a proxy service, or may request any other feature modification within an access network or a core network.

Figure 2H:
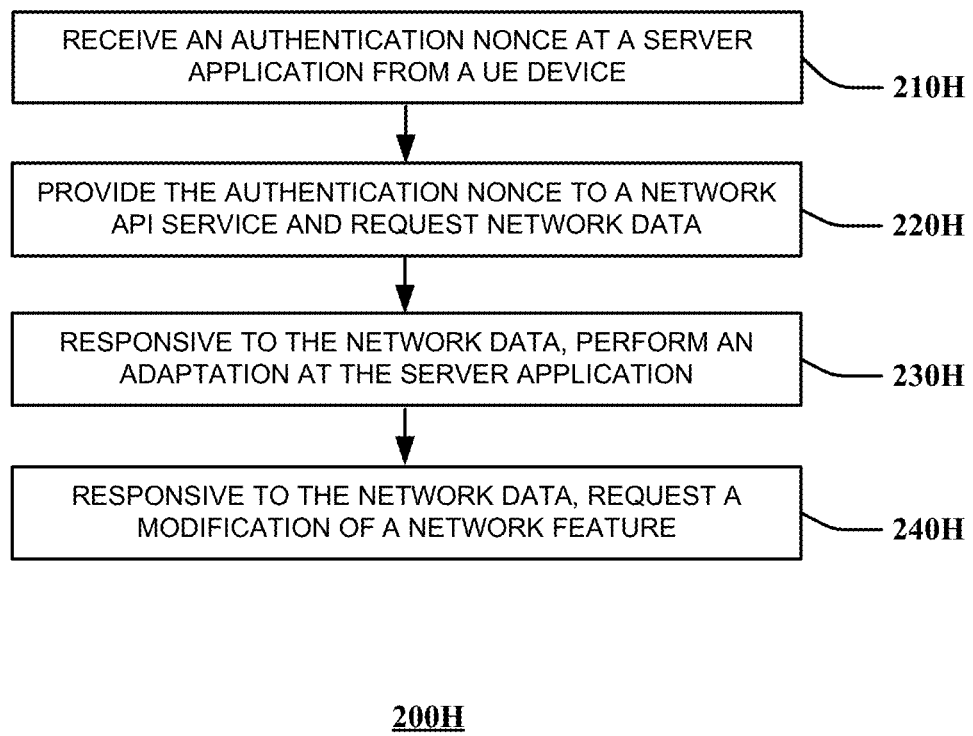

Referring to FIG. 2H, method 200H may be performed by a server in communication with a user device across a communications network. For example, a server running as a virtual machine, or an application running on a virtual machine may perform the various actions of method 200H.

At 210H, an authentication nonce is received from a UE device. In some embodiments, this corresponds to a UE device providing an authentication nonce to the server so that the server may request network API services on behalf of the user device. At 220H, the authentication nonce is provided to a network API service to request network data. At 230H, responsive to network data received at the server, the server performs an adaptation. At 240H, the server may request a modification of a network feature responsive to the network data. In some embodiments, a server may request a modification of a network feature without first requesting network data. In these embodiments, a request for modification of a network feature is not responsive to receive network data.

FIG. 2I is a block diagram illustrating an example, non-limiting embodiment of a user device requesting an internet protocol (IP) address of an application server in accordance with various aspects described herein. FIG. 2I shows UE 210A, application controller 220I, edge cloud platform 230I, network API service 158, and three edge locations 240I, 250I, and 260I. UE 210A is described above with reference to previous figures. Application 212I may be any application running on UE 210A. For example, application 212I may be a video application on a mobile device, an entertainment application within an automobile, an application running on a laptop device connected to a Wi-Fi access point, or the like. Application controller 220I may be a controller at the edge of a core network whose job it is to interface directly with applications that are accessing the core network. For example, in some embodiments, application controller 220I may be implemented as a 5G access and mobility management function (AMF).

Edge cloud platform 230I may be any platform capable of managing resources at the edge of the network. For example, edge cloud platform may be a platform owned and managed by a third party with an arms-length business relationship with a service provider providing services to application 212I and UE 210A. Typically, an edge cloud platform having an arms-length business relationship with a network service provider may not have access to low-level network information within the service provider's network. Accordingly, typically an edge cloud platform will instantiate an application server in the cloud without the benefit of low-level network data that may be provided as described herein by network API service 158.

In operation, an application 212I running on UE 210A requests an application server IP address from application controller 220I at 214I. Application controller 220I, at 222I, provides a request to edge cloud platform 230I to select, instantiate, locate, or otherwise place an application server in an edge location and return the application server's IP address so that application controller 220I can provide the IP address to UE 210A. In response to the application server placement request, edge cloud platform 230I may request network data from network API service 158 at 232I.

As described further below, edge cloud platform 230I may request application-level data from network API service 158 to determine network metrics regarding possible edge locations for an application server. For example, edge cloud platform 230I may request information regarding end-to-end latency between UE 210A and each of edge locations 240I, 250I, and 260I. Also for example, edge cloud platform 230I may request end-to-end bandwidth data between UE 210A and the various edge cloud locations.

Figure 2J:
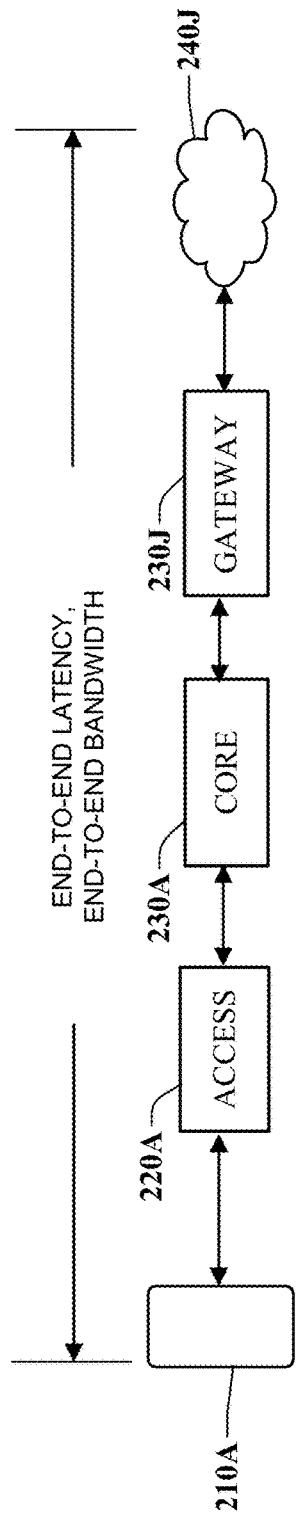
FIG. 2J is a block diagram illustrating an example, non-limiting embodiment of network data useful in guiding a decision regarding an application server location in an edge cloud in accordance with various aspects described herein.

FIG. 2J is a block diagram illustrating an example, non-limiting embodiment of network data useful in guiding a decision regarding an application server location in an edge cloud in accordance with various aspects described herein. As shown in FIG. 2J, an application-level metric may include an end-to-end latency, an end-to-end bandwidth, or any other metric regarding one or more characteristics of a network path between UE 210A and edge location 240J. In some embodiments, network API service 158 collects low-level network data representing latency and bandwidth within access network 220A, core network 230A, gateway 230J and edge cloud location 240J.

When edge cloud platform 230I requests application-level data (metrics), the analytics engine within network API service 158 may analyze the stored data and synthesize an application-level metric from the low-level network data describing the latency or and/or bandwidth within the various elements shown in FIG. 2J. In some embodiments, this is performed for every possible edge cloud location. For example, the analysis may be performed when edge location 240J represents edge location 240I (FIG. 2I). Also for example, the analysis may be performed for every other possible edge location including edge locations 250I and 260I (FIG. 2I). The application-level metrics represented in FIG. 2J may provide guidance to edge cloud platform 230I with respect to a location at which an application server may be located, placed, or instantiated.

Figure 2K:
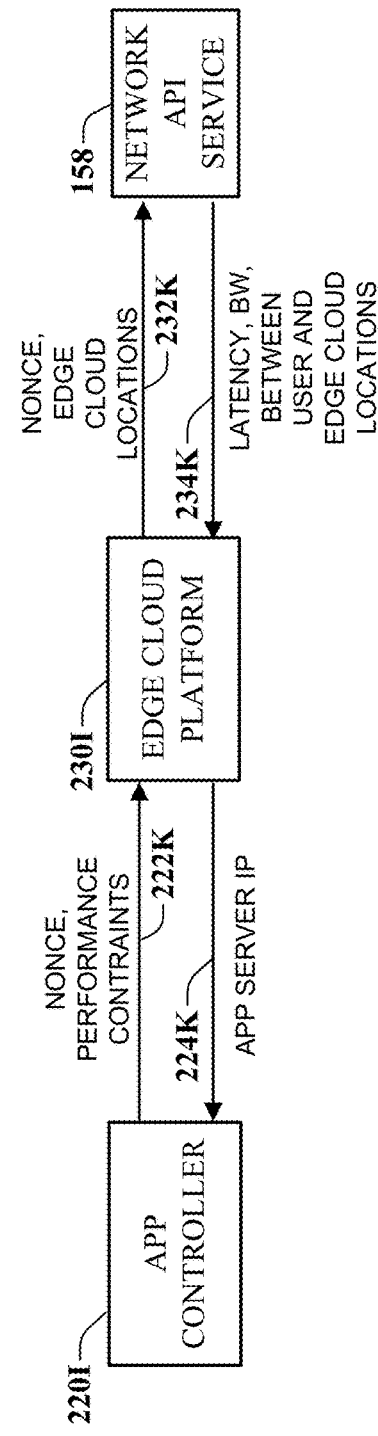
FIG. 2K is a block diagram illustrating an example, non-limiting embodiment of an edge cloud platform interacting with a network API service in accordance with various aspects described herein.

FIG. 2K is a block diagram illustrating an example, non-limiting embodiment of an edge cloud platform interacting with a network API service in accordance with various aspects described herein. Application controller 220I provides the authentication nonce and optionally also provides performance constraints to edge cloud platform 230I at 222K. Example performance constraints may include an allowable latency between the user device and the application server, an uplink network bandwidth and/or a downlink network bandwidth, a number of central processing unit (CPU) cores, and any need for special hardware requirements such as graphics processors or field programmable gate arrays (FPGAs).

At 232K, edge cloud platform 230I provides the authentication nonce and identifiers of the edge cloud locations to network API service 158 as part of a network API request. In response, the analytics engine within network API service 158 may compute end-to-end bandwidth and/or end-to-end latency for each potential edge cloud location provided at 232K. Network API service 158 provides application-level metrics that represent the end-to-end latency and bandwidth between the user and the various edge cloud locations to edge cloud platform 230I at 234K. In response to receiving the end-to-end latency and bandwidth values, edge cloud platform 230I may select one of the edge cloud locations at which to locate, place, or instantiate an application server. Once the application server is located, an IP address for the application server may be provided back to application controller 220I at 224K.

The actions shown in FIG. 2K represent edge cloud platform 230I accessing a network guidance API within network API service 158. In some embodiments, edge cloud platform 230I may also access a network control API within network API service 158. For example, edge cloud platform 230I may request a modification of a network feature within access network 220A, core network 230A or gateway 230J.

Figure 2L:
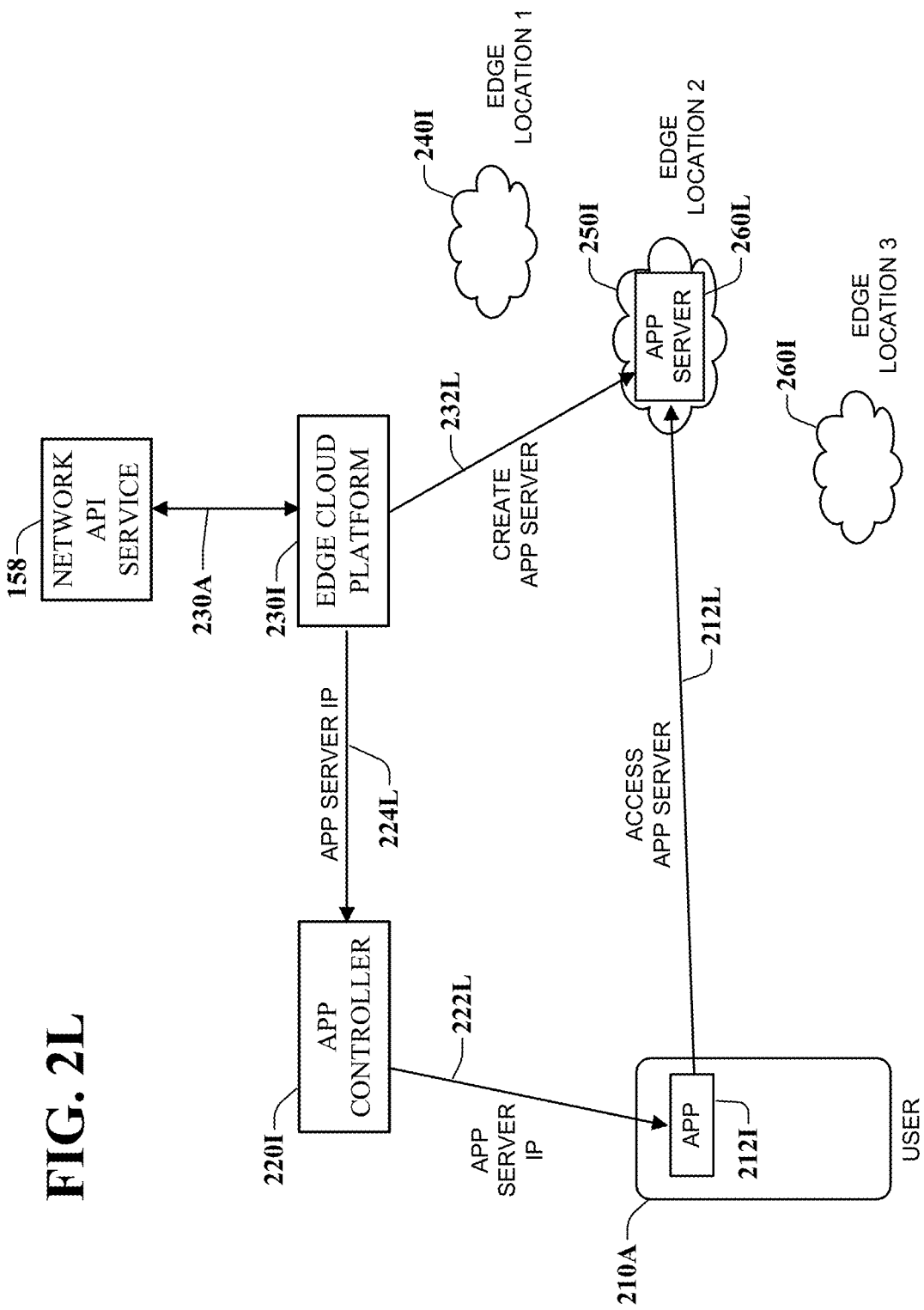
FIG. 2L is a block diagram illustrating an example, non-limiting embodiment of an edge cloud platform locating an application server in an edge cloud location in accordance with various aspects described herein.

FIG. 2L is a block diagram illustrating an example, non-limiting embodiment of an edge cloud platform locating an application server in an edge cloud location in accordance with various aspects described herein. As shown in FIG. 2L, edge cloud platform 230I has requested services from network API service 158 at 230A as described above with reference to FIG. 2K and has selected edge cloud location 250I to locate application server 260L. This is shown at 232L where edge cloud platform 230I locates application server 260L at edge location 250I. "Locating" an application server may refer to determining a location of an existing application server, selecting from a list of application servers, instantiating a new application server, or the like. In some embodiments, an application server may be located by moving an existing application server or deleting an existing application server and instantiating a new application server.

Once the application server is located, edge cloud platform 230I may provide the application server IP address to application controller 220I at 224L. Application controller 220I may then provide the application server IP address to application 212I at 222L. Application 212I may then access the application server 260L at edge cloud location 250I at 212L.

Although FIG. 2L shows the location, placement, or instantiation of an application server at an edge cloud location, the various aspects of the disclosure are not limited in this respect. For example, the various actions described may be used to determine the location of any network element in any access network or core network or cloud platform. For example, gateway 230J shown in FIG. 2J may be placed to provide communication between core network 230A and an edge cloud location. The placement of that gateway may be guided by application-level metrics obtained from a network API service. In general, the placement of any element within any network may be guided through the use of a network API service as described herein. Also for example, the various described may be used to request redirection and/or rerouting. If multiple application servers are already available at different network edge locations, network API service 158 may be used to choose the "best" application server to serve a given client request. Such a request redirection/routing is related to, but is distinct from, the initial placement of application server. Request redirection can make use of the network API service 158 to estimate the latency or bandwidth from the user making the request to each existing application server located on network edge.

Figure 2M:
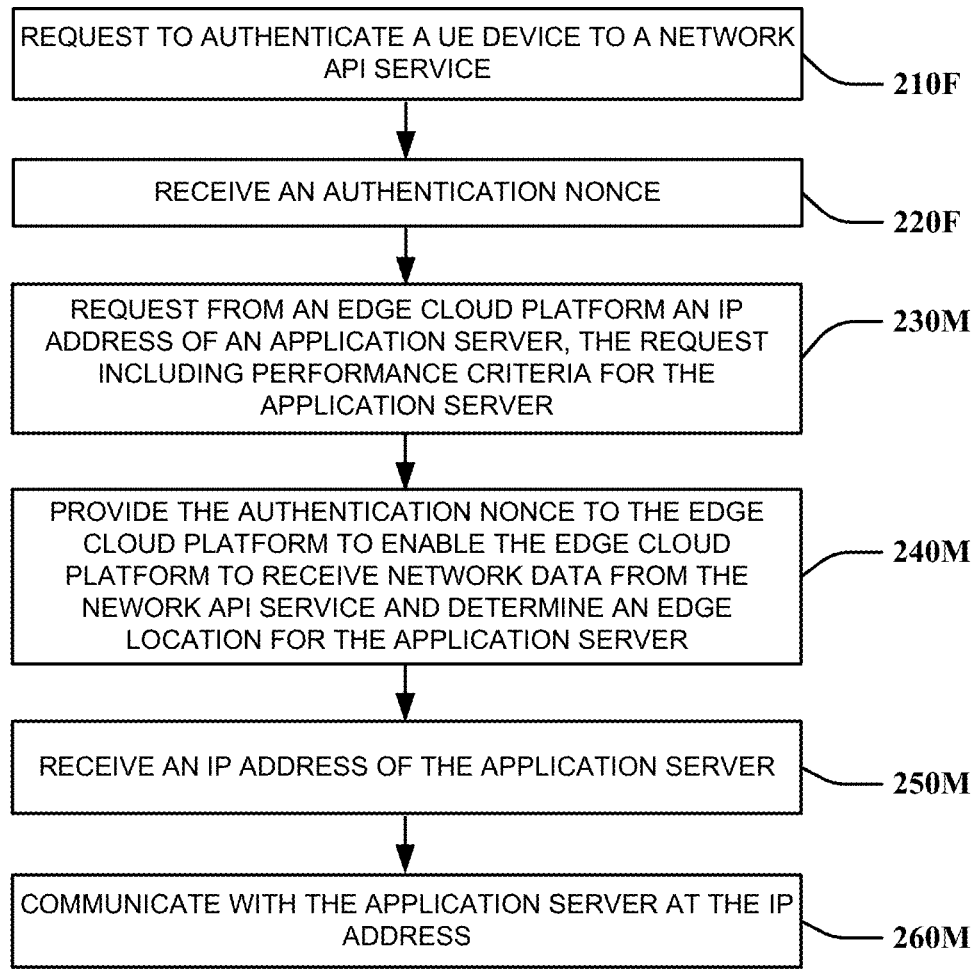
FIGS. 2M-2O depict illustrative embodiments of methods in accordance with various aspects described herein.
Figure 2N:
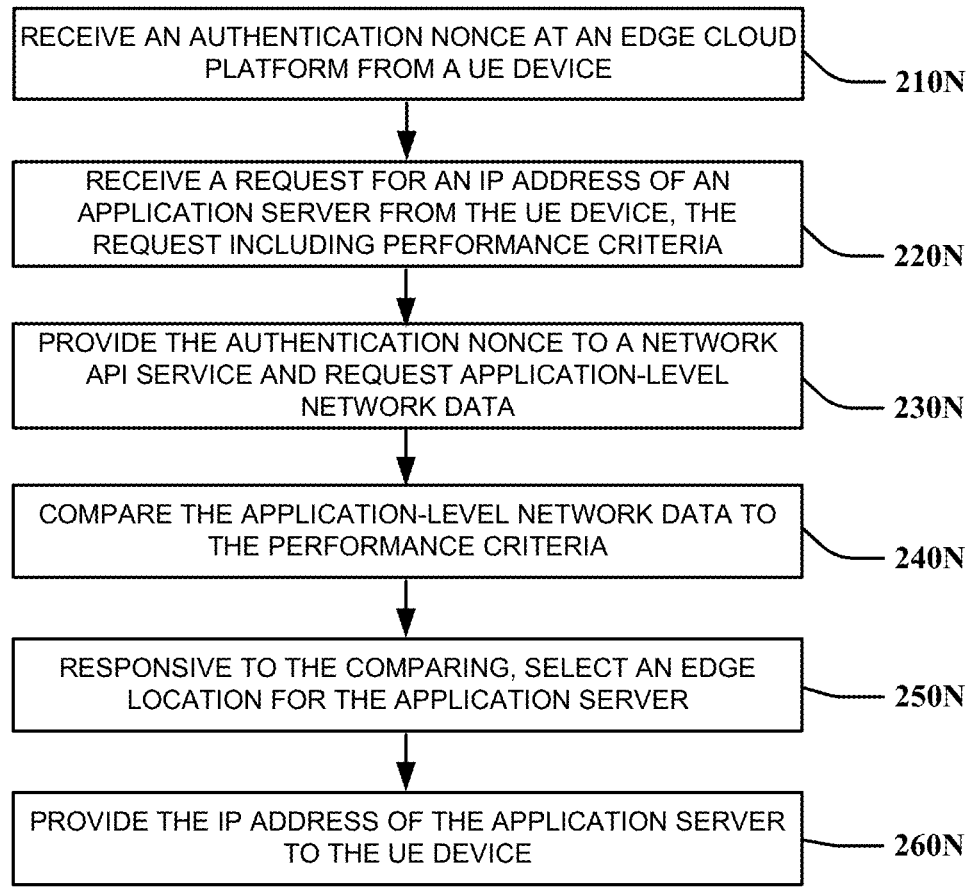
Figure 2O:
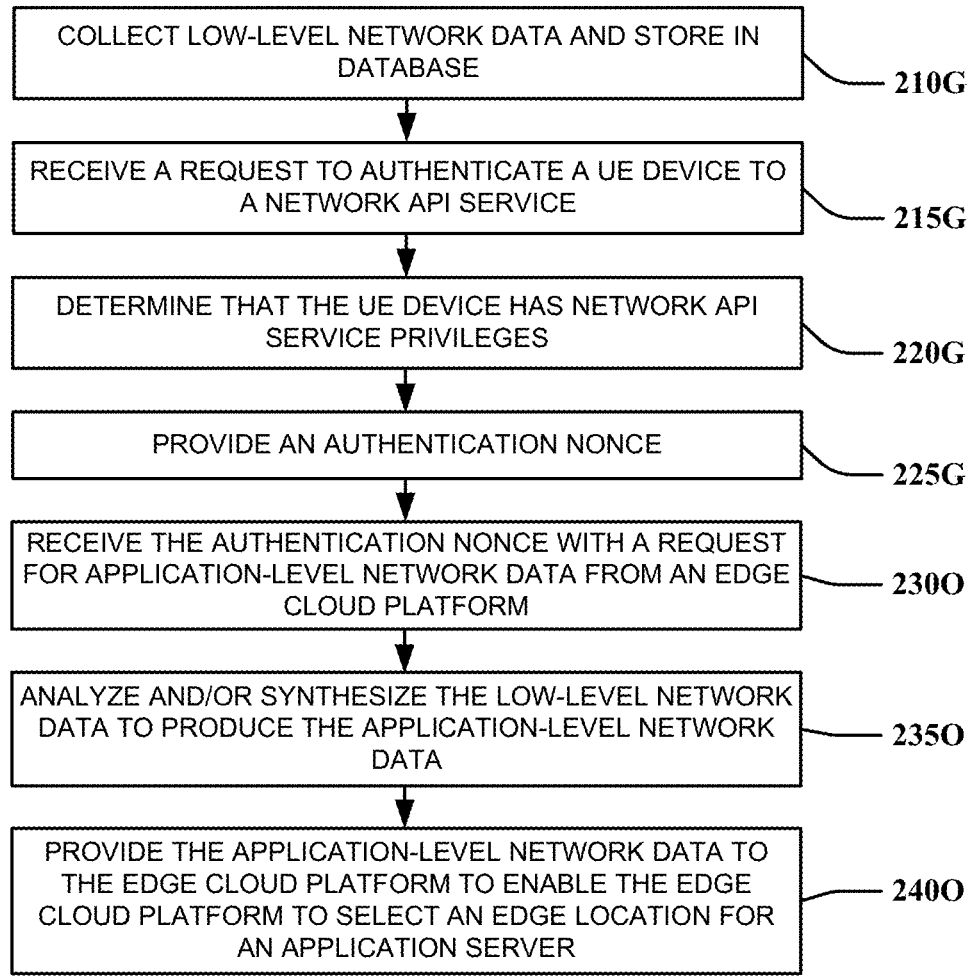

FIGS. 2M-2O depict illustrative embodiments of methods in accordance with various aspects described herein. Referring to FIG. 2M, method 200M may be performed by a user, a user equipment (UE) device, an application running on a UE device, or any other consumer of network API services. For example, the operations of method 200M may be performed by a broadband customer having a tethered connection to a laptop computer, a mobility customer with a handheld device connected to a radio access network, an application running on an infotainment center in an automobile, or the like.

At 210F, a request to authenticate a UE device to a network API service is performed. In some embodiments, this corresponds to a UE device authenticating on behalf of an application running on the device, on behalf of the device itself, or on behalf of a user to which the UE device is registered. At 220F, an authentication nonce is received. As described above, the authentication nonce may be a cryptographic nonce, a non-cryptographic nonce, or any other identifier capable of identifying a user to a network API service. At 230M, a request for an IP address of an application server is made to an edge cloud platform. In some embodiments, the request is made indirectly through one or more network elements such as an application controller. The request may include performance criteria for the application server. Examples of performance criteria include latency, bandwidth, hardware constraints such as a number of CPU cores, types of CPUs, special purpose hardware such as field programmable gate arrays (FPGA) or application specific integrated circuits (ASIC), and the like. Any performance criteria relating to the location or operation of an application server may be included at 230M.

At 240M, the authentication nonce is provided to the edge cloud platform to enable the edge cloud platform to receive network data from the network API service and determine an edge location to locate the application server. In some embodiments, this corresponds to the authentication nonce received from the network API service being provided to an edge cloud platform so that the edge cloud platform may request services from the network API service on behalf of the UE device making the request. For example, the edge cloud platform may request application-level metrics representing end-to-end bandwidth and/or end-to-end latency describing latency and bandwidth between the user device and various possible edge cloud locations at which an application server may be located. The edge cloud platform may then select a location for the application server, and then provide an IP address of the application server back to the UE device at 250M. The UE device receives the IP address of the application server at 250M and is then able to communicate with the application server at that IP address at 260M.

Referring now to FIG. 2N, method 200N may be performed by an edge cloud platform that locates, places, and/or instantiates application servers in edge cloud locations. For example, method 200N may be performed by edge cloud platform 230I.

At 210N, an authentication nonce is received at an edge cloud platform from a UE device. At 220N, a request for an IP address of an application server is received from the UE device. In some embodiments, the request for an IP address is received indirectly. For example, the request may be routed through any number of network elements, such as application controller 220I (FIG. 2I). In some embodiments, the request includes performance criteria. Examples of performance criteria include latency, bandwidth, hardware constraints such as a number of CPU cores, types of CPUs, special purpose hardware such as field programmable gate arrays (FPGA) or application specific integrated circuits (ASIC), and the like. Any performance criteria relating to the location or operation of an application server may be included at 220N.

In some embodiments, an application server may already be instantiated at an edge cloud location and the IP address of that application server may be provided back to the requesting UE device. In other embodiments, multiple application servers may already be instantiated at various edge cloud locations, and the remainder of method 200N may be used to select one of the application servers at one of the edge cloud locations and then provide the IP address of that selected application server back to the device. In still further embodiments, the edge cloud platform may need to instantiate an application server to satisfy the request from the UE device and the remainder of method 200N may be used to select an edge cloud location to instantiate the application server and then provide that IP address back to the UE device.

At 230N, the edge cloud platform provides the authentication nonce to a network API service and requests application-level network data. For example, the edge cloud server may request application-level network data (metrics) describing end-to-end bandwidth and/or end-to-end latency between the UE device making the request and various edge cloud locations. The various edge cloud locations may be locations at which application servers already exist, or edge cloud locations at which an application server may be instantiated. Once received, the application-level network data is compared to the performance criteria at 240N. In some embodiments, this may correspond to comparing a desired end-to-end bandwidth with actual end-to-end bandwidth values provided by the network API service for various edge cloud locations. In other embodiments, this may correspond to comparing desired hardware constraints against network data describing actual hardware that exists at various edge cloud locations.

At 250N, responsive to comparing the application-level network data to the performance criteria, an edge location is selected. In some embodiments selecting an edge cloud location corresponds to selecting a location at which an application server is already present. In other embodiments, selecting an edge cloud location corresponds to selecting the location to instantiate a new application server. Once the application server is selected and/or instantiated, the IP address of the application server is provided to the requesting UE device at 260N.

In some embodiments, the network API service may provide guidance for the entire path from the UE to an edge cloud location. For example, a shortest and/or fastest path through access network 220A, and a shortest and/or fastest path through core network 230A may be determined as well as application-level metrics regarding edge cloud locations.

As part of this process, the network API service may first compute guidance for smaller network segments (e.g., access link, aggregation, network core, etc.). The network API service may then combine this data to provide an end-to-end estimate. In some embodiments, the network API service may also provide future guidance (e.g., next one minute or five minutes using long term estimates).

The end-to-end latency may include access latency within access network 220A, core latency within core network 230A, gateway latency in gateway 220J, and edge cloud latency at the various edge cloud locations. End-to-end bandwidth may be determined as the minimum bandwidth available in any network element in the network path between user UE 210A and the potential edge cloud location. In some embodiments, guidance for the entire path is provided so that selections may be made that increase the minimum bandwidth available. For example, a network path that includes a gateway with extra available bandwidth may be chosen over an otherwise shorter network path in response to guidance received from a network API service.

In some embodiments, tens to hundreds (or more) of possible locations exist at the network edge. The application server may be a container, a virtual machine, a cloudlet, a process running on an edge cloud, or the like. In some embodiments, the edge cloud platform selects the edge cloud location based on guidance from the network API service which informs network path characteristics from the user device to each edge cloud location. Path characteristics exposed by the network API may include latency, bandwidth, jitter, and the like.

In some embodiments, edge locations that do not match network performance constraints provided by the application are filtered out. For example, if a latency of a particular network path exceeds a limit requested by the application, that path may be filtered out of the set of possible network paths. Also for example, edge locations that do not match other hardware constraints (e.g., availability of compute resources such as free CPU cores or availability of specific hardware such as GPUs or FPGAs) are filtered out. The remaining edge cloud locations may then be ranked based on a ranking function that considers latency, bandwidth, available resources, etc. The top ranked location may then be selected, and the application server may be located at that edge cloud location.

Referring now to FIG. 2O, method 200O may be performed by a network API service such as network API service 158. At 210G, low-level network data is collected and stored in a network database. As described above, the low-level network data may describe any characteristics and/or locations of network elements within any access network, core network, or the like. In some embodiments, the low-level network data is stored in a distributed database and in other embodiments the low-level network data is stored in a centralized database. At 215G, a request to authenticate a UE device is received at a network API service. At 220G, the network API service determines that the UE device has network API service privileges. In some embodiments, this corresponds to the network API service querying a network operator to verify that the device is registered to a customer of the network operator. In other embodiments, this corresponds to the network API service consulting a user account of a network operator customer to determine that that customer and/or that one or more UE devices of that customer has network API service privileges.

Once determining that the device has network API service privileges, the API network service provides an authentication nonce back to the UE device to be utilized when requesting API services. In some embodiments, the value of the authentication nonce is determined in real-time by the network API service. For example, the authentication nonce may be produced by a random number generator, or may be produced cryptographically as part of a challenge/response handshake that may be used to authenticate a user device. At 230O, the authentication nonce is received with a request for application-level network data (metrics) from an edge cloud platform. In some embodiments, the request for application-level network data includes a request for end-to-end bandwidth and/or end-to-end latency between the UE device and various edge cloud locations.

At 235O, the low-level network data collected at 210G is analyzed and/or synthesized to produce the requested application-level network data. In some embodiments, this corresponds to computing the end-to-end bandwidth and/or end-to-end latency between the UE device and the various edge cloud locations. In other embodiments, this may correspond to providing information regarding capabilities of various network elements such as the capability of CPUs in the various network paths. At 240O, the application-level network data is provided to the edge cloud platform to enable the edge cloud platform to select an edge location to locate an application server. In some embodiments, the actions at 240O correspond to enabling the edge cloud platform to select an edge cloud location where an application server already exists or to instantiating an application server at the selected edge cloud location.

The actions described with reference to methods 200M, 200N, and 200O may be used for a UE device to request access to an application server, and for an edge cloud platform to utilize guidance provided by a network API service to determine a location of an application server based on network data.

Although the actions of the above methods are described with respect to determining a location for an application server, in some embodiments, the actions of the methods are utilized to re-optimize an application server placement. For example, an edge cloud platform or application controller may wish to re-optimize placement of an application server if performance is deemed insufficient at a present location (e.g., due to user mobility, a change in network performance, a change in application requirements, etc.). The application controller may request migration of the application server to an edge cloud location by performing a request with the latest performance requirements from the user application. The edge cloud platform may then select another location that meets the new performance constraints using a similar placement algorithm. The edge cloud platform may then migrate the existing application server to the new edge cloud location or delete the existing application server and create a new application server and then return the new IP address to the user.

While for purposes of simplicity of explanation, the respective processes are shown and described as a series of blocks in FIGS. 2F-2H and 2M-2O, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2Q:
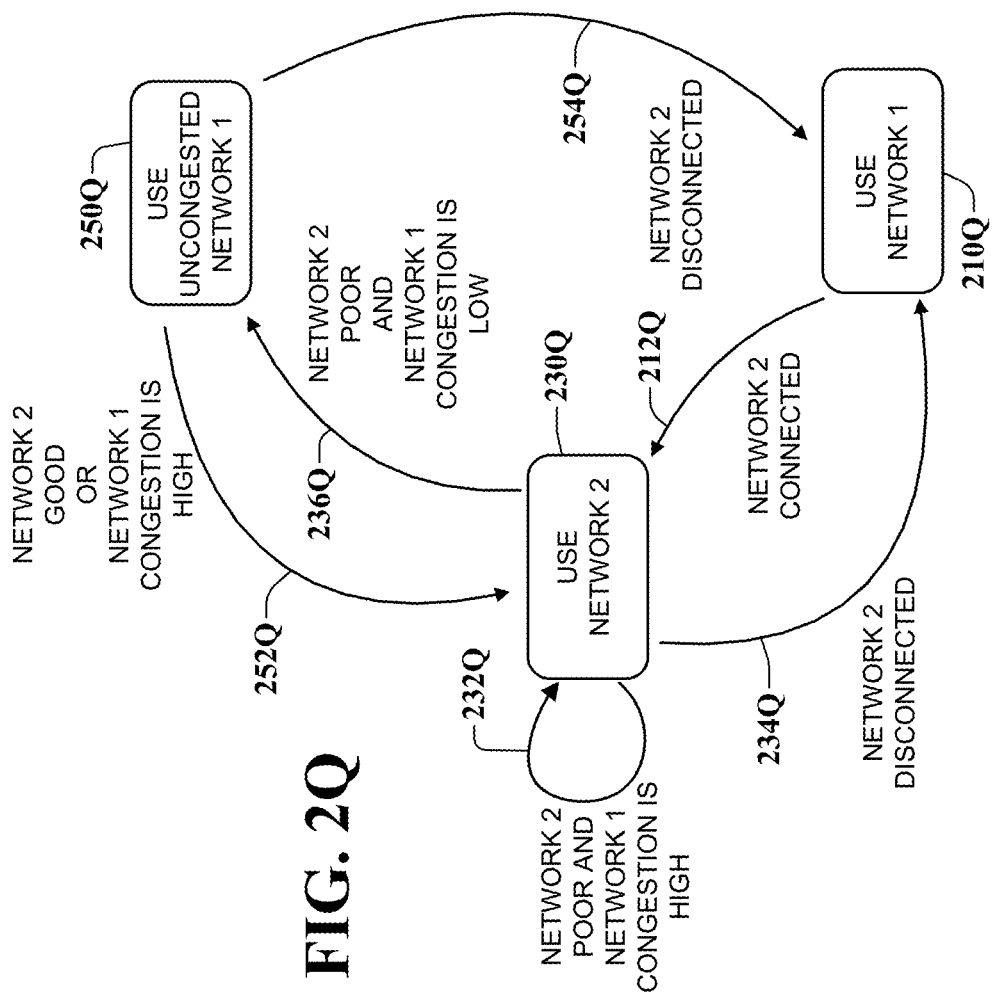
FIG. 2Q is a block diagram illustrating an example, non-limiting embodiment of a state diagram describing a user device interacting with two networks in accordance with various aspects described herein.
Figure 2P:
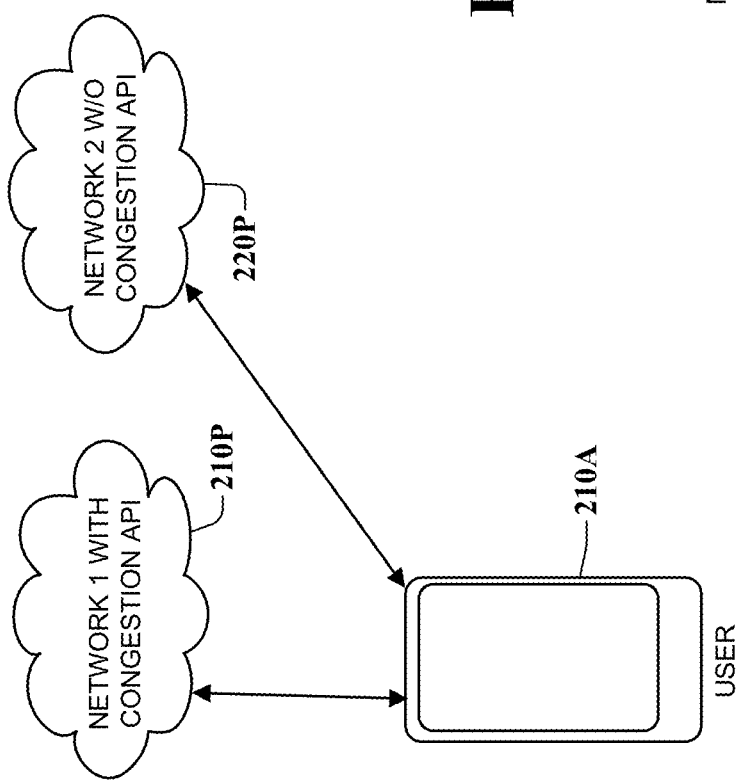
FIG. 2P is a block diagram illustrating an example, non-limiting embodiment of a user device interacting with two networks in accordance with various aspects described herein.

FIG. 2P is a block diagram illustrating an example, non-limiting embodiment of a user device interacting with two networks in accordance with various aspects described herein. As shown in FIG. 2P, UE 210A may communicate with network 210P (network 1) or network 220P (network 2), or both. In some embodiments, network 210P is a network that implements a network API service that provides guidance regarding congestion within the network. This network API service is referred to herein as a congestion API. Network 220P represents a network that does not have the congestion API. In some embodiments, the congestion API utilizes low-level network data collected from various network elements (e.g., a serving cell in a cellular network for the requesting device) to determine a congestion value that may be used as a metric by the user device. For example, a congestion metric may be represented as an integer with a discrete range that indicates the congestion level of a serving cell. For example, and not by way of limitation, a value of 0 may represent no congestion, a value of 100 may represent heavy congestion, and values in between may represent relative congestion.

Also for example, a network congestion API may provide historical congestion values that represent congestion over a previous period of time. In some embodiments, the historical time value may be provided as part of an API request so that a UE device may be able to discover historical congestion values for any previous time period.

In some embodiments, a network API service that implements a congestion API may collect low-level network data representing parameters of congestion such as numbers of users, process utilization blocks, uplink and downlink usage, and the like. An analytics engine within the network API service may utilize these parameters to determine congestion values in response to network API service requests for congestion information.

FIG. 2Q is a block diagram illustrating an example, non-limiting embodiment of a state diagram describing a user device interacting with two networks in accordance with various aspects described herein. In the example of FIG. 2Q, network 2 is a preferred network for the UE device. In some embodiments, network 2 may be preferred because the user of the UE device purchases services from the network provider that provides services over network 2.

The UE is shown using network 2 at state 230Q. Using information and guidance provided by a congestion API, the UE may stay connected to network 2 or may move to network 1. For example, the UE may determine that the service provided by network 2 is poor or may determine that the service provided by network 2 is good. The terms "poor" and "good" are relative and the UE device may determine whether service is poor or good using any criteria. For example, a UE device may determine that the service provided by network 2 is poor if there is a low signal strength, if the network is unsecured, if there are transient disconnections, or if bandwidth is low or latency is high. In general, any criteria may be utilized to determine whether the service provided by network 2 is either poor or good.

If at 232Q, the UE device determines that network 2 is poor and network one congestion is high, then the UE device may continue to use network 2. Alternatively, if network 2 is poor and network 1 congestion is low, the UE device may use network 1 in part because it appears uncongested. This moves the current state to state 250Q at 236Q. On the other hand, if network 2 is disconnected at 234Q, the UE device will use network 1 regardless of the congestion of network 1. This is shown at state 210Q. States 210Q and 250Q both result in the UE device using network 1, however the reasons for using network 1 in the two states are different.

From state 210Q, the UE device may go back to using network 2 if it becomes reconnected at 212Q. Similarly, from state 250Q, the UE device may go back to using network 2 if the network 2 service is good or if network 1 congestion becomes high at 252Q. Lastly, from state 250Q the UE device may move to state 210Q with no change in network usage if network 2 becomes disconnected at 254Q.

The state diagram in FIG. 2Q represents one possible use of a network API service, and specifically a congestion API. Many other uses for network API services including congestion APIs exist. For example, uploads and/or downloads may be scheduled based on application-level metrics received from a congestion API. In some embodiments, a delay tolerant upload or download may be scheduled in the future if a congestion API indicates that a network is congested, or may be scheduled to be performed immediately if a congestion API indicates that a network is currently uncongested. Also for example, any application adaptation may be performed in response to application-level metrics received from a congestion API. For example, a periodic process may be run that performs a congestion API request to determine network congestion, and if network congestion is low the application may adapt by switching to a higher quality user experience, and if network congestion is high, the application may adapt by switching to a lower quality experience.

In some embodiments, network API services may support network-aware route planning. Consider a GPS application on an automobile. While doing the route planning to a destination, the GPS application may use the network API service to check whether the network quality is sufficient along the chosen route to support in-car applications (e.g., streaming videos, cloud-assisted autonomous driving).

In some embodiments, network API services may support location-based services: Some network features may be available to users only in specific locations. For example, a low-latency network slice may only be available in a sports arenas or a factory floor. The network API service may notify user devices of additional features they can choose as they move into these locations.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems and methods presented in FIGS. 1, and 2A-2Q. For example, virtualized communication network 300 can facilitate in whole or in part, a network API service that collects and stores data from various network elements and access networks, and then makes that data available to applications and other entities that otherwise typically would not have access to network data. The network API service may provide guidance APIs, control APIs, congestion APIs, and other API embodiments.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs);

reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third-party locations.

Figure 4:
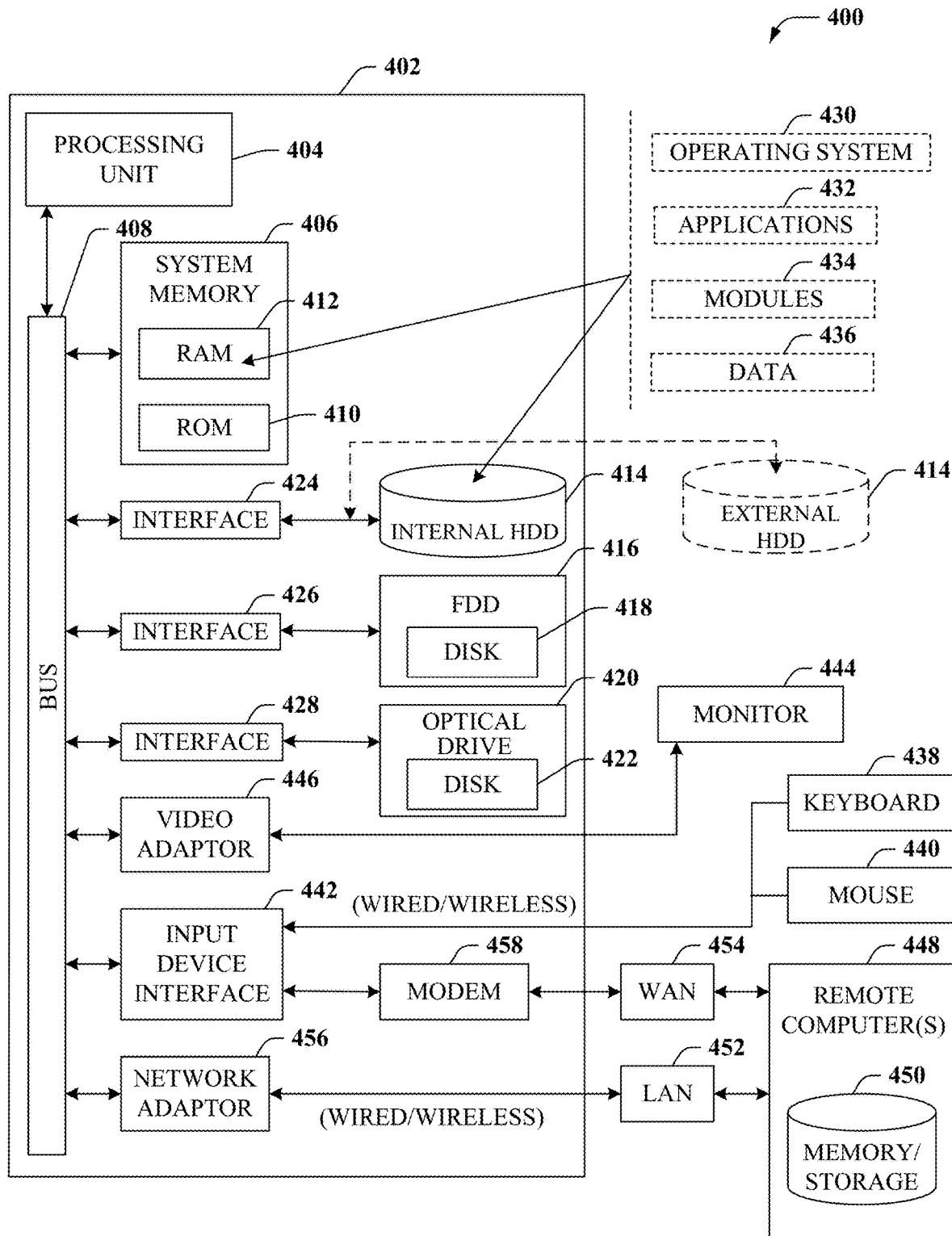
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a UE device, an application server, a network API service, an analytics engine, network storage, an edge cloud platform, edge cloud locations, and the like.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
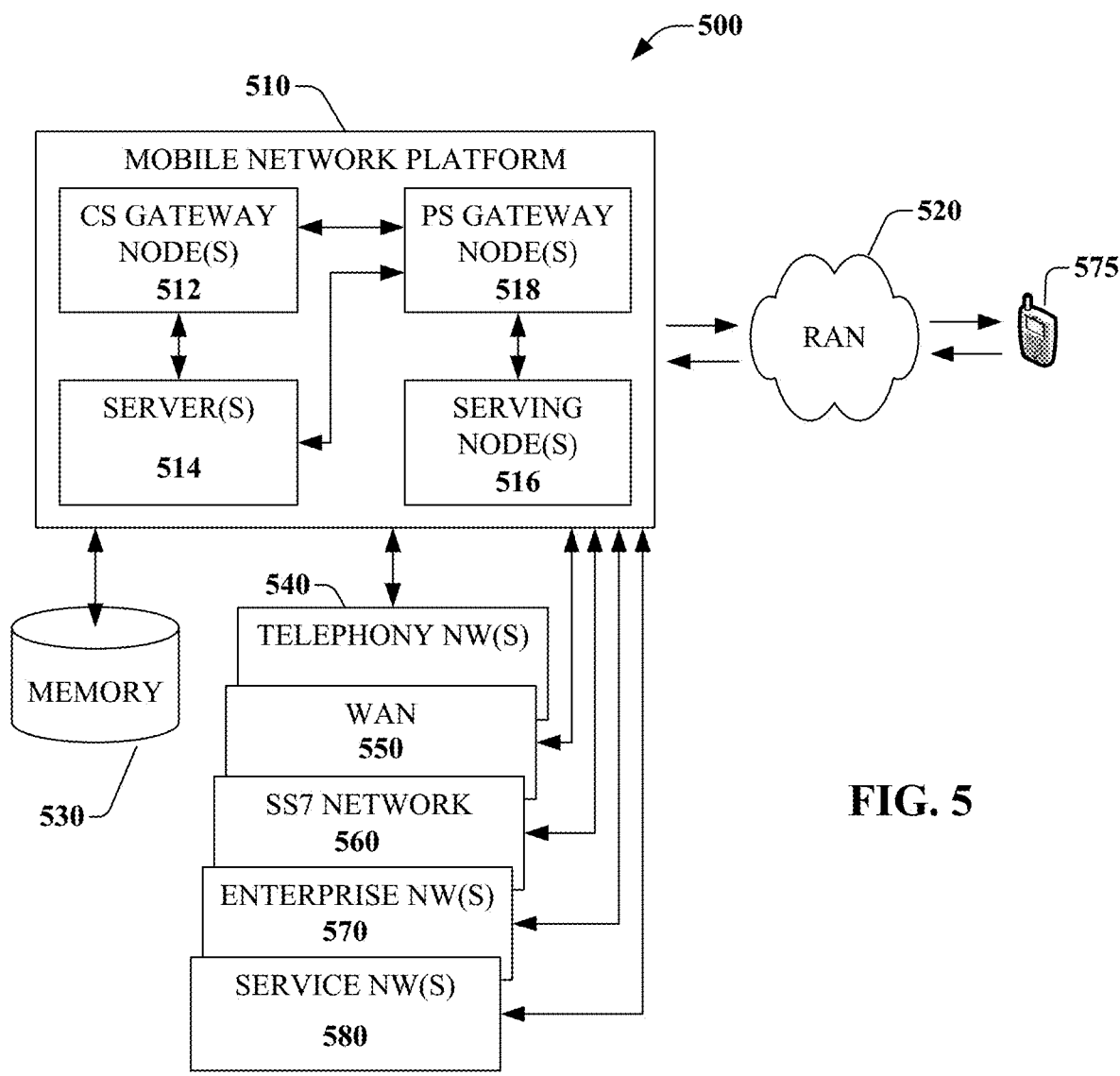
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part, a network API service that collects and stores data from various network elements and access networks, and then makes that data available to applications and other entities that otherwise typically would not have access to network data. The network API service may provide guidance APIs, control APIs, congestion APIs, and other API embodiments. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
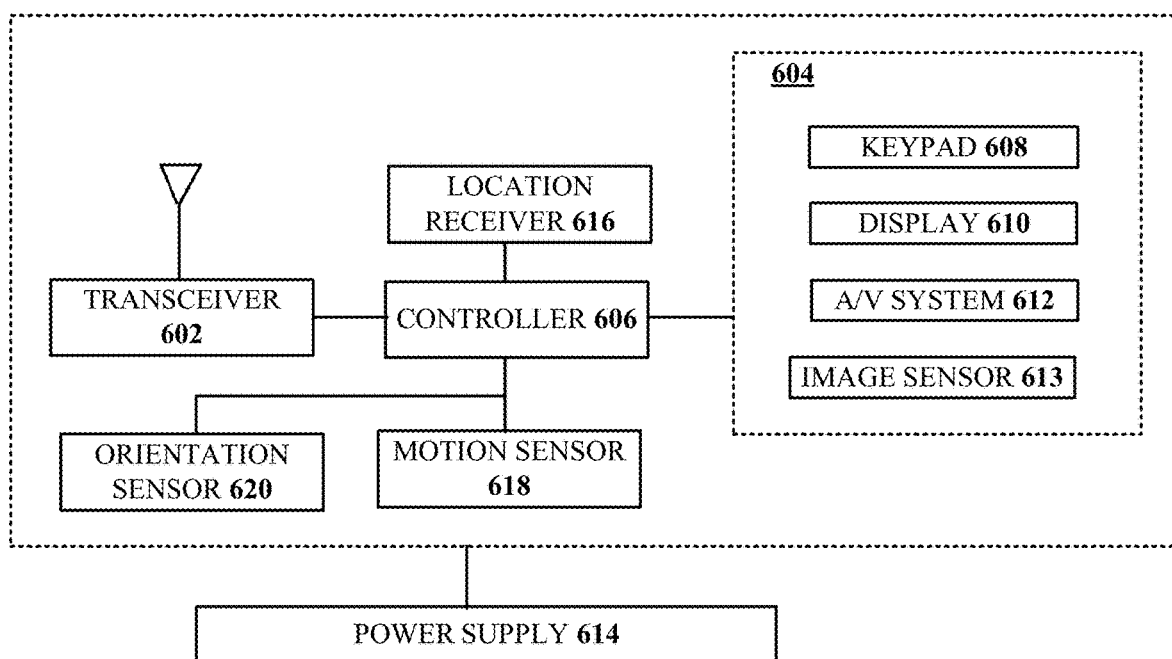
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a UE device that may communicate with a network API service.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth ZigBee, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . xn), to a confidence that the input belongs to a class, that is, f(x)

=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A user equipment (UE) device comprising:
a processing system including a processor; and
a memory that stores executable instructions that, when executed by the processing system, facilitate performance of operations, the operations comprising:
authenticating to a network application programming interface (API) service in communication with an access network and a core network, wherein the network API service is configured to expose network data outside the core network and the access network;
responsive to the authenticating, receiving an authentication nonce;
providing the authentication nonce to an edge cloud platform to enable the edge cloud platform to receive the network data from the network API service and determine an edge location to instantiate an application server, the application server having an IP address;
receiving the IP address of the application server; and
communicating with the application server at the IP address.

2. The UE device of claim 1, wherein providing the authentication nonce further comprises requesting the instantiation of the application server subject to performance constraints.

3. The UE device of claim 2, wherein the performance constraints comprise a latency constraint.

4. The UE device of claim 2, wherein the performance constraints comprise a bandwidth constraint.

5. The UE device of claim 2, wherein the performance constraints comprise a hardware constraint.

6. The UE device of claim 5, wherein the hardware constraint comprises a number of central processing unit (CPU) cores.

7. A method comprising:
collecting, by a processing system including a processor, low-level network data and storing it in a database;
receiving, by the processing system, an authentication request from a user equipment (UE) device;
determining, by the processing system, that the UE device has network application programming interface (API) service privileges;
providing, by the processing system, an authentication nonce to the UE device;

receiving, by the processing system, the authentication nonce from an edge cloud platform;

receiving, by the processing system, a request for application-level network data from the edge cloud platform;

analyzing, by the processing system, the low-level network data to create the application-level data; and providing, by the processing system, the application-level data to the edge cloud platform to enable the edge cloud platform to select an edge location to instantiate an application server.

8. The method of claim 7, wherein the low-level network data comprises an access network latency.

9. The method of claim 8, wherein the low-level network data further comprises a core network latency.

10. The method of claim 9, wherein the analyzing comprises combining the access network latency and the core network latency to create an application level latency.

11. The method of claim 7, wherein the application-level data comprises network path characteristics between the UE device and a plurality of potential edge locations to instantiate the application server.

12. The method of claim 11 wherein the network path characteristics comprise a latency characteristic.

13. The method of claim 11 wherein the network path characteristics comprise a bandwidth characteristic.

14. The method of claim 11 wherein the network path characteristics comprise a jitter characteristic.

15. A method comprising:

collecting, by a processing system including a processor, low-level network data and storing it in a database;

receiving, by the processing system, an authentication request from a user equipment (UE) device;

determining, by the processing system, that the UE device has network application programming interface (API) service privileges;

providing, by the processing system, an authentication nonce to the UE device;

receiving, by the processing system, a request from the UE device for a congestion metric describing a network congestion;

analyzing, by the processing system, the low-level network data to create the congestion metric; and providing, by the processing system, the congestion metric to the UE device.

16. The method of claim 15 wherein the congestion metric describes congestion in an access network.

17. The method of claim 16 wherein:

the collecting low-level network data comprises collecting the low-level network data from a serving cell in an access network; and the analyzing the low-level network data to create the congestion metric comprises analyzing the low-level network data from the access network.

18. The method of claim 17 wherein the low-level network data from the access network comprises a number of users connected to the serving cell.

19. The method of claim 15 wherein the congestion metric describes congestion in a core network.

20. The method of claim 15 wherein the analyzing the low-level network data to create the congestion metric comprises analyzing historical low-level network data.

\* \* \* \* \*